United States Patent
Holland et al.

(10) Patent No.: US 9,086,186 B2
(45) Date of Patent: Jul. 21, 2015

(54) SYSTEM HAVING REMOVABLE LUBRICANT RESERVOIR AND LUBRICANT REFILLING STATION

(75) Inventors: Christopher D. Holland, Wood River, IL (US); Paul G. Conley, St. Charles, MO (US)

(73) Assignee: Lincoln Industrial Corporation, St. Louis, MO (US)

(*) Notice: Subject to any disclaimer, the term of this patent is extended or adjusted under 35 U.S.C. 154(b) by 621 days.

(21) Appl. No.: 13/273,742

(22) Filed: Oct. 14, 2011

(65) Prior Publication Data

US 2013/0092284 A1 Apr. 18, 2013

(51) Int. Cl.
| | |
|---|---|
| *B65B 3/12* | (2006.01) |
| *B65D 90/34* | (2006.01) |
| *B67D 7/06* | (2010.01) |
| *F16N 35/00* | (2006.01) |
| *F16N 37/00* | (2006.01) |

(52) U.S. Cl.
CPC ............... *F16N 35/00* (2013.01); *F16N 37/00* (2013.01)

(58) Field of Classification Search
CPC .......... F01M 11/04; F16N 37/00; F16N 21/04
USPC .................................................... 184/105.1
See application file for complete search history.

(56) References Cited

U.S. PATENT DOCUMENTS

| | | |
|---|---|---|
| 910,802 A | 1/1909 | Enos et al. |
| 1,384,353 A | 7/1921 | Shavers |
| 1,673,134 A | 6/1928 | Barks |
| 1,773,660 A | 8/1930 | Barks |
| 1,801,414 A | 4/1931 | Davis |
| 2,103,063 A | 12/1937 | Clark |
| 2,569,110 A | 9/1951 | McGillis et al. |
| 2,627,320 A | 2/1953 | Rotter |

(Continued)

FOREIGN PATENT DOCUMENTS

| | | |
|---|---|---|
| DE | 9412699 U1 | 12/1995 |
| DE | 19623537 A1 | 12/1997 |

(Continued)

OTHER PUBLICATIONS

International Search Report from for PCT/US2011/057580 dated Mar. 8, 2012, 2 pgs.

(Continued)

*Primary Examiner* — William E Dondero
*Assistant Examiner* — Mark K Buse
(74) *Attorney, Agent, or Firm* — Senniger Powers LLP

(57) ABSTRACT

A lubricant reservoir refilling system. The system includes a removable reservoir having a tank for receiving lubricant, a refill inlet fluidly communicating with the tank, and a connector. The refilling system also includes a refilling station including a refill housing having a connector configured for releasable connection with the reservoir connector, an inlet on the refill housing adapted for connection to a supply of lubricant, and an outlet on the refill housing positioned for fluid communication with the reservoir refill inlet when the reservoir is connected to the refilling station to allow delivery of lubricant from the refilling station through the reservoir refill inlet to refill the tank. The refill housing connector is functionally identical to a connector on a pump assembly so the reservoir including the tank can be removed from the refilling station and removably connected to the pump.

21 Claims, 25 Drawing Sheets

(56) References Cited

U.S. PATENT DOCUMENTS

| | | | |
|---|---|---|---|
| 2,766,848 A | 10/1956 | Bystricky et al. | |
| 2,858,964 A | 11/1958 | North | |
| 2,867,481 A | 1/1959 | Hornbostel | |
| 3,025,559 A | 3/1962 | Basinger | |
| 3,507,359 A | 4/1970 | Warnock | |
| 3,609,066 A | 9/1971 | Wegmann | |
| 3,659,675 A * | 5/1972 | Edelstein et al. | 184/39 |
| 3,722,967 A | 3/1973 | Lewis | |
| 3,951,480 A | 4/1976 | Nicholson | |
| 3,958,725 A | 5/1976 | Reeve | |
| 3,972,387 A * | 8/1976 | Braun | 184/28 |
| 4,018,305 A | 4/1977 | Tietje | |
| 4,069,835 A | 1/1978 | Stadler | |
| 4,326,603 A | 4/1982 | Darrow et al. | |
| 4,375,246 A | 3/1983 | Tietje | |
| 4,483,375 A | 11/1984 | Martin | |
| 4,718,824 A | 1/1988 | Cholet et al. | |
| 4,759,427 A | 7/1988 | Onose | |
| 5,022,556 A | 6/1991 | Dency et al. | |
| 5,038,892 A | 8/1991 | Maloney | |
| 5,038,893 A | 8/1991 | Willner et al. | |
| 5,126,722 A | 6/1992 | Kamis | |
| 5,178,405 A | 1/1993 | Brandstadter | |
| 5,293,959 A | 3/1994 | Kimberlin | |
| 5,469,897 A | 11/1995 | Haytner et al. | |
| 5,626,467 A | 5/1997 | Cantley | |
| 5,685,331 A | 11/1997 | Westermeyer | |
| 5,838,352 A | 11/1998 | Martinez | |
| 5,850,849 A | 12/1998 | Wood | |
| 5,954,240 A | 9/1999 | Duchon et al. | |
| 5,961,299 A | 10/1999 | Gruett et al. | |
| 5,996,858 A | 12/1999 | Tapp et al. | |
| 6,012,551 A | 1/2000 | Raab | |
| 6,039,805 A | 3/2000 | Davis et al. | |
| 6,161,723 A | 12/2000 | Cline et al. | |
| 6,164,561 A | 12/2000 | Yoshida et al. | |
| 6,216,822 B1 | 4/2001 | May et al. | |
| 6,244,387 B1 | 6/2001 | Paluncic et al. | |
| 6,305,404 B1 | 10/2001 | Steiger | |
| 6,322,336 B1 | 11/2001 | Huss | |
| 6,478,415 B2 | 11/2002 | Barinaga et al. | |
| 6,705,432 B2 | 3/2004 | Conley et al. | |
| 6,793,042 B2 | 9/2004 | Brouillet | |
| 6,840,603 B2 | 1/2005 | Barinaga et al. | |
| 6,886,589 B2 | 5/2005 | Oretti | |
| 6,945,640 B2 | 9/2005 | Cheok | |
| 7,059,450 B2 | 6/2006 | O'Toole et al. | |
| 7,195,117 B2 | 3/2007 | Vitye | |
| 7,441,568 B2 | 10/2008 | Porter et al. | |
| 7,845,582 B2 | 12/2010 | Joseph et al. | |
| 7,931,171 B2 | 4/2011 | Hamamura et al. | |
| 2002/0144865 A1 | 10/2002 | Clancy et al. | |
| 2002/0157901 A1 | 10/2002 | Kast et al. | |
| 2003/0039561 A1 | 2/2003 | Batten et al. | |
| 2004/0129499 A1 | 7/2004 | Okpokowuruk | |
| 2005/0180870 A1 | 8/2005 | Stanley et al. | |
| 2006/0186031 A1 | 8/2006 | Fick et al. | |
| 2007/0177835 A1 | 8/2007 | Verhaegen | |
| 2007/0289994 A1 | 12/2007 | Kotyk | |
| 2007/0295753 A1 | 12/2007 | Vangeel et al. | |
| 2008/0240944 A1 | 10/2008 | Arens | |
| 2009/0032337 A1 | 2/2009 | Scott | |
| 2009/0278872 A1 | 11/2009 | Turgeman | |
| 2010/0084403 A1 | 4/2010 | Popish et al. | |
| 2010/0155321 A1 | 6/2010 | Sasur et al. | |
| 2010/0307634 A1 * | 12/2010 | Ficai et al. | 141/3 |
| 2011/0174577 A1 | 7/2011 | Kreutzkamper et al. | |
| 2012/0134847 A1 | 5/2012 | Conley et al. | |

FOREIGN PATENT DOCUMENTS

| | | |
|---|---|---|
| GB | 2205905 A | 12/1988 |
| JP | 02080815 | 3/1990 |
| JP | 02195020 | 8/1990 |

OTHER PUBLICATIONS

Written Opinion from PCT/US2011/057580 dated Mar. 8, 2012, 5 pgs.

International Search Report regarding corresponding PCT/US2013/030464, dated Sep. 27, 2013, 4 pages.

Written Opinion of the International Searching Authority, PCT/2013/030464, dated Sep. 27, 2013, 7 pages.

* cited by examiner

SYSTEM HAVING REMOVABLE LUBRICANT RESERVOIR AND LUBRICANT REFILLING STATION

FIELD OF THE INVENTION

The present invention generally relates to apparatus for supplying lubricant, and more particularly to an automatic lubrication system having a removable lubricant reservoir and a lubricant refilling station.

BACKGROUND OF THE INVENTION

This invention has particular application to automatic lubrication systems for supplying lubricant to multiple points of lubrication at predetermined intervals and/or in predetermined amounts. Lincoln Industrial Corp. sells such automated systems under the Quicklub®, Centro-Matic® and Helios® trademarks. The Quicklub® system includes a reservoir for holding a supply of lubricant, a stirrer for stirring the lubricant, and an electric or pneumatic pump for pumping lubricant from the reservoir to one or more progressive metering (divider) valves, each operating to dispense lubricant to multiple points of lubrication. U.S. Pat. No. 6,244,387, incorporated herein by reference, provides further details regarding an exemplary Quicklub® system. The Centro-Matic® system is similar to a Quicklub® system except lubricant from the pump is delivered through a single supply line to injectors, each operating to dispense a metered amount of lubricant to a single lubrication point. U.S. Pat. No. 6,705,432, incorporated herein by reference, provides further details regarding an exemplary Centro-Matic® system. The Helios® system is a dual line system.

Although these systems have been proven to be reliable and commercially successful, there is a need for lubricant distribution systems having replaceable lubricant reservoirs providing for remote reservoir refilling and storage. Further, there is a need for a lubricant refilling station for refilling the reservoirs.

SUMMARY OF THE INVENTION

In one aspect, the present invention is directed to a lubricant reservoir refilling system comprising a removable reservoir including a tank for receiving lubricant, a refill inlet fluidly communicating with the tank, and a connector. The lubricant reservoir refilling system also comprises a refilling station including a refill housing having a connector configured for releasable connection with the reservoir connector, an inlet on the refill housing adapted for connection to a supply of lubricant, and an outlet on the refill housing positioned for fluid communication with the reservoir refill inlet when the reservoir is connected to the refilling station to allow delivery of lubricant from the refilling station through the reservoir refill inlet to refill the tank. The refill housing connector is functionally identical to a connector on a pump assembly so the reservoir including the tank can be removed from the refilling station and removably connected to the pump assembly by connecting the reservoir connector to the pump assembly connector.

In another aspect, the present invention includes a lubricant reservoir pumping system comprising a pump assembly including a housing having a connector and a lubricant pump for pumping lubricant to a lubrication site. The lubricant pump has an inlet for receiving lubricant and a outlet for discharging lubricant at a pressure higher than that of lubricant at the inlet. The lubricant reservoir pumping system also includes a removable reservoir including a tank for holding lubricant, a connector for selectively connecting the tank to the connector on the pump assembly housing, and an outlet positioned to fluidly communicate with the pump inlet when the tank is connected to the pump assembly housing.

In still another aspect, the present invention includes a removable lubricant reservoir for use with a pump assembly. The pump assembly includes a housing having a connector and a pump for pumping lubricant to a lubrication site. The pump has an inlet for receiving lubricant. The reservoir comprises a tank having an interior adapted for holding lubricant and a bottom for retaining lubricant in the tank interior when the reservoir is removed from the pump assembly. The reservoir also includes a locking ring rotatably mounted on the tank for removably connecting the tank to the connector of the housing of the pump assembly. The reservoir further includes an outlet positioned for fluidly communicating with the pump inlet when the tank is connected to the housing of the pump assembly.

The yet another aspect, the present invention includes a lubricant refilling station for refilling a lubricant reservoir removed from a pump assembly. The pump assembly includes a lubricant pump for pumping lubricant from the reservoir and a housing having a connector for selectively connecting the reservoir to the pump assembly. The reservoir includes a tank for receiving lubricant, a connector for selectively connecting the tank to the connector on the housing of the pump assembly, and a refill inlet on the tank for refilling the tank with lubricant. The lubricant refilling station comprises a refill housing having a connector functionally identical to the pump housing connector. The lubricant refilling station also includes an inlet on the refill housing adapted for connection to a supply of lubricant. The lubricant refilling station further includes an outlet on the refill housing positioned to fluidly communicate with the reservoir tank refill inlet when the tank is connected to the refilling station connector. The lubricant refilling station also includes a lubricant supply. The lubricant refilling station further includes a refilling pump fluidly connected to the lubricant supply and the inlet of the refill housing for pumping lubricant from the lubricant supply to the refill inlet of the tank when the tank is connected to the housing of the lubricant refilling station.

Other objects and features will be in part apparent and in part pointed out hereinafter.

BRIEF DESCRIPTION OF THE DRAWINGS

Corresponding parts are indicated by corresponding reference numbers throughout the drawings.

DETAILED DESCRIPTION

Figure 1:
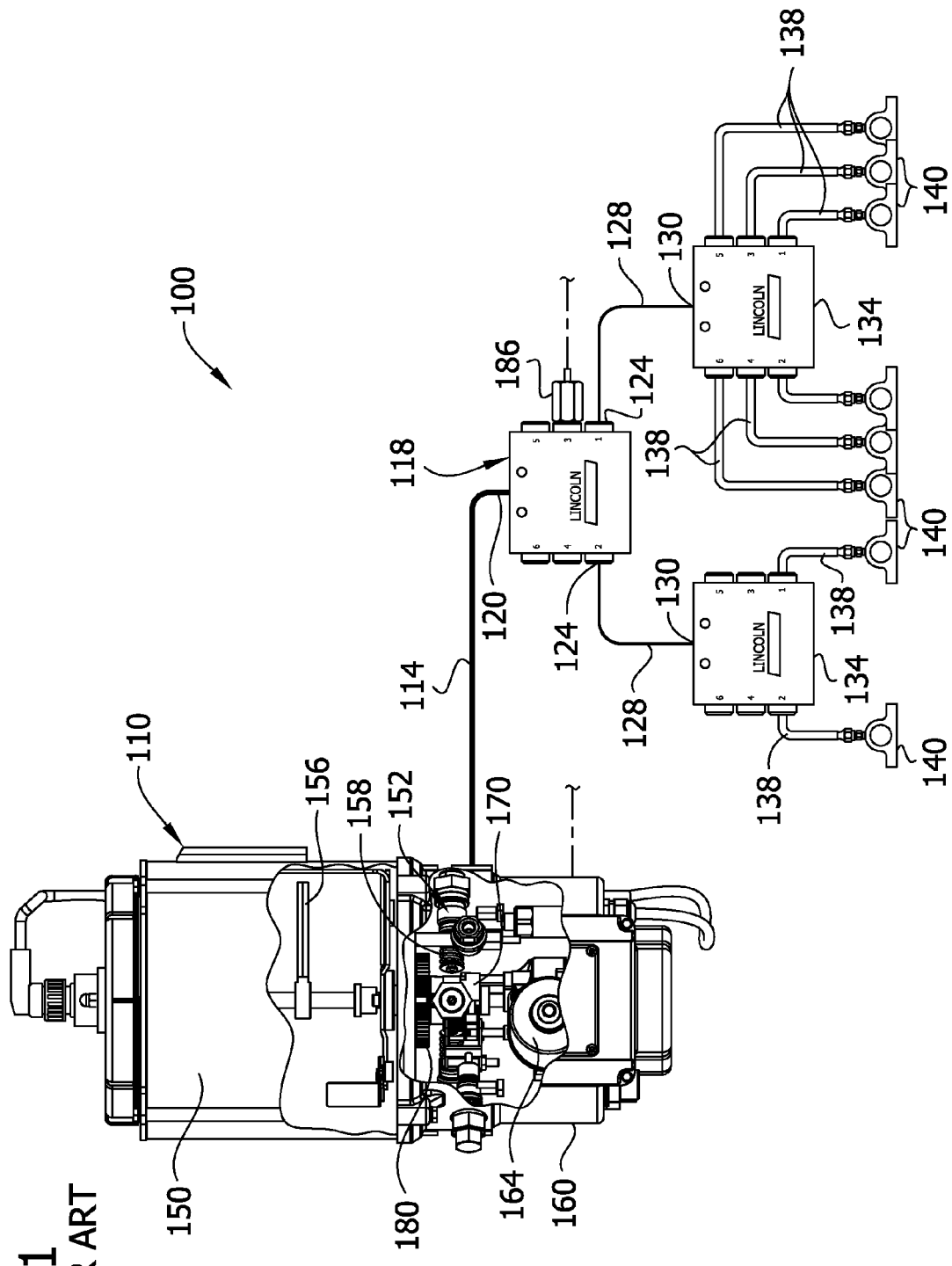
FIG. 1 is a diagrammatic view of a conventional automated lubrication system including divider valves for directing lubricant to points of lubrication.

FIG. 1 illustrates a conventional Quicklub® system, generally designated 100, comprising a pumping system 110 that pumps lubricant through a lube supply line 114 to a master divider valve, generally designated by 118, having an inlet 120 and multiple outlets 124 connected by lines 128 to inlets 130 of additional (slave) divider valves, generally designated by 134. The slave divider valves 134 are connected via lines 138 to bearings 140 or other points of lubrication. The number of divider valves 134 used will vary depending on the number of lubrication points.

The pumping system 110 includes a reservoir 150 for holding lubricant (e.g., grease), a pump assembly 152 below the reservoir, and a stirrer 156 for stirring lubricant in the reservoir. The pump assembly 152 includes an expansible pump chamber 158 in a pump housing 160 below the reservoir 150. A motor 164 in the pump housing rotates the stirrer 156 to stir lubricant in the reservoir. The motor 164 also rotates an eccentric mechanism 170 to move a spring-biased piston through a series of strokes to pump lubricant through the supply line 114 to the divider valves 118, 134. The mechanism for driving the stirrer 156 and the eccentric mechanism 170 includes a relatively bulky drive train 180 comprising several gears. The pumping system 110 includes a programmable controller for controlling operation of the motor 164 and for receiving signals from a proximity switch 186 monitoring operation of the master divider valve 118.

Figure 2:
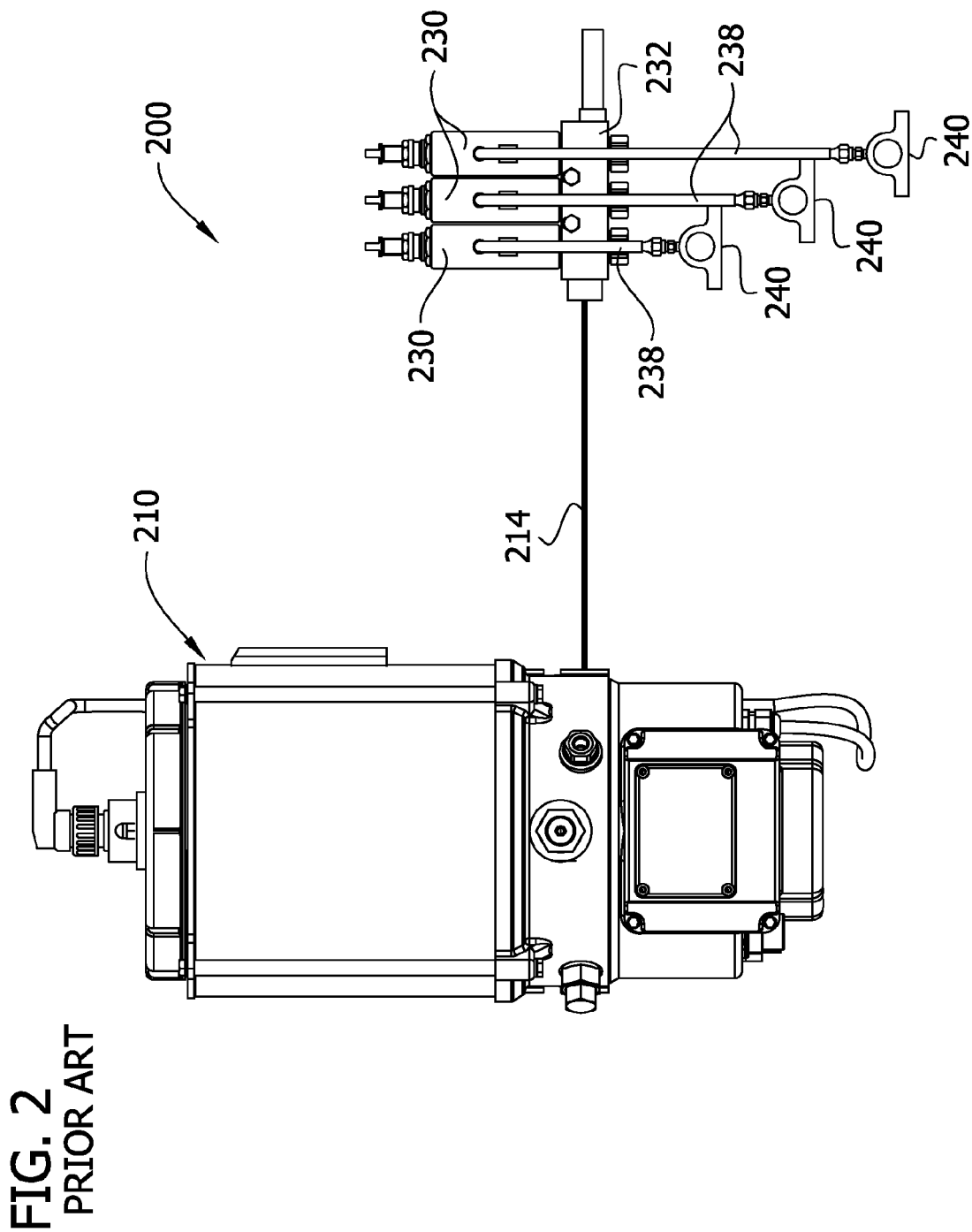
FIG. 2 is a diagrammatic view of a conventional automated lubrication system including injectors for directing lubricant to points of lubrication.

FIG. 2 illustrates a conventional Centro-Matic® system, generally designated 200, comprising a pumping system 210 that pumps lubricant through a lube supply line 214 to a plurality of injectors 130, each having an inlet communicating with the lube supply line 214 via passages in a manifold 232, and an outlet 236 connected via a line 238 to a bearing 240 or other point of lubrication. The pumping system 210 is similar to the pumping system 110 described above.

Figure 3:
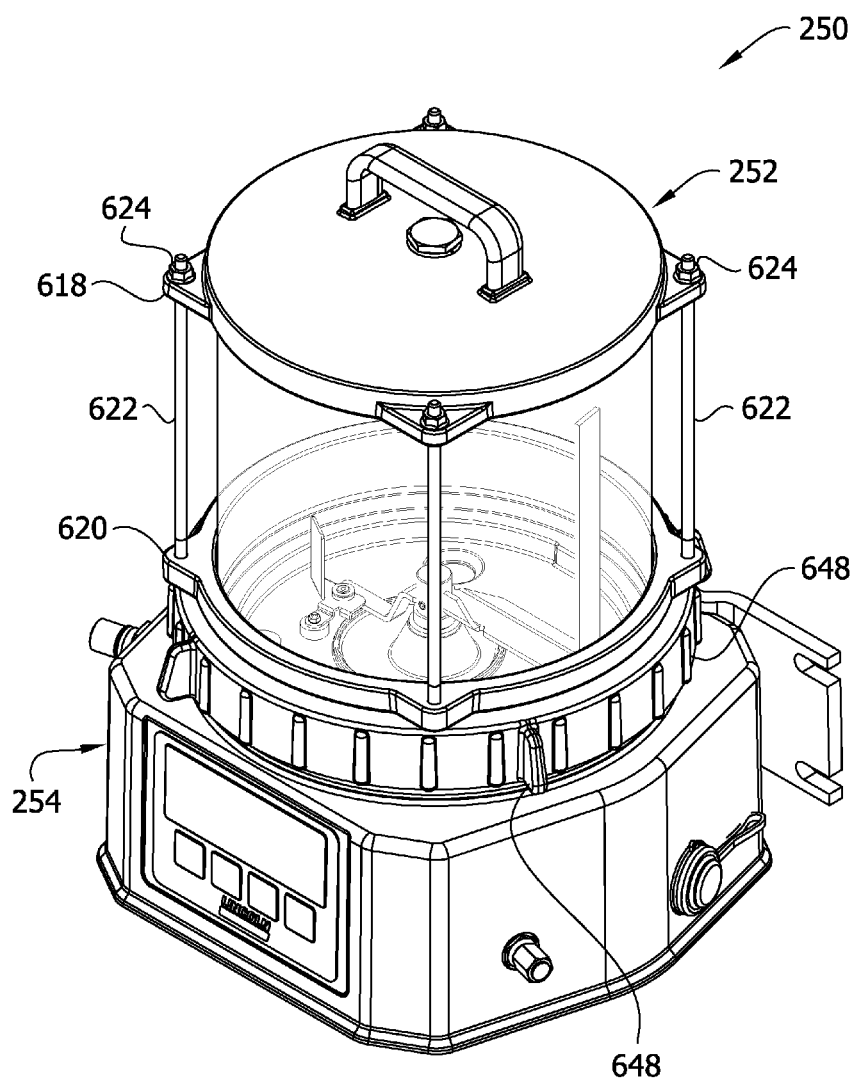
FIG. 3 is a perspective of an embodiment of a pumping system of the present invention.
Figure 4:
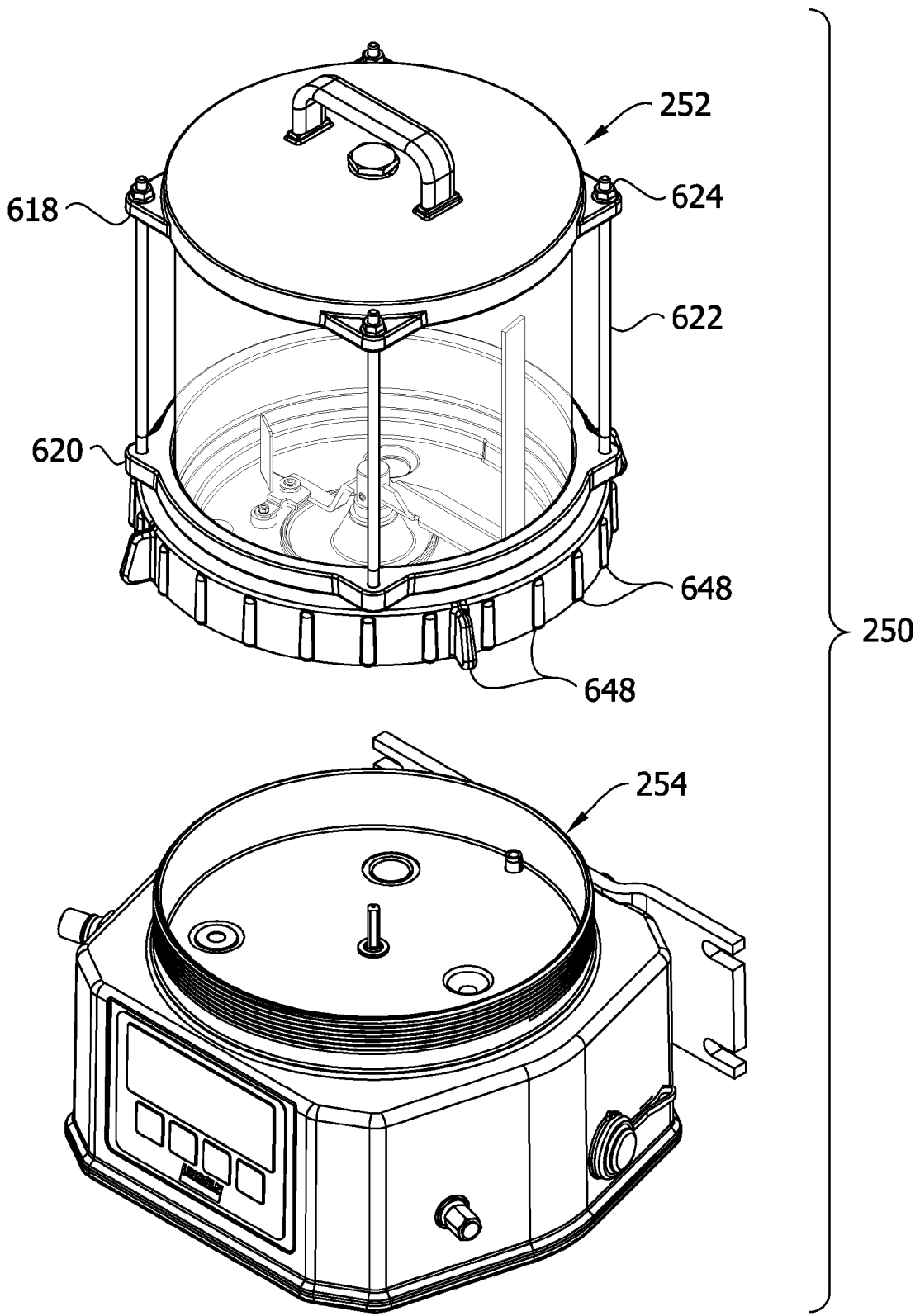
FIG. 4 is a perspective of the embodiment of the pumping system of FIG. 3 showing a reservoir separated from a pump assembly.

FIG. 3 illustrates one embodiment of a lubricant reservoir pumping system of the present invention, designated in its entirety by the reference number 250. The pumping system 250 comprises a reservoir, generally designated by 252, for holding a supply of lubricant and a pump assembly, generally designated by 254, below the reservoir. As illustrated in FIG. 4, the reservoir 252 is removable from the pump assembly 254 for refilling and replacement.

Figure 5:
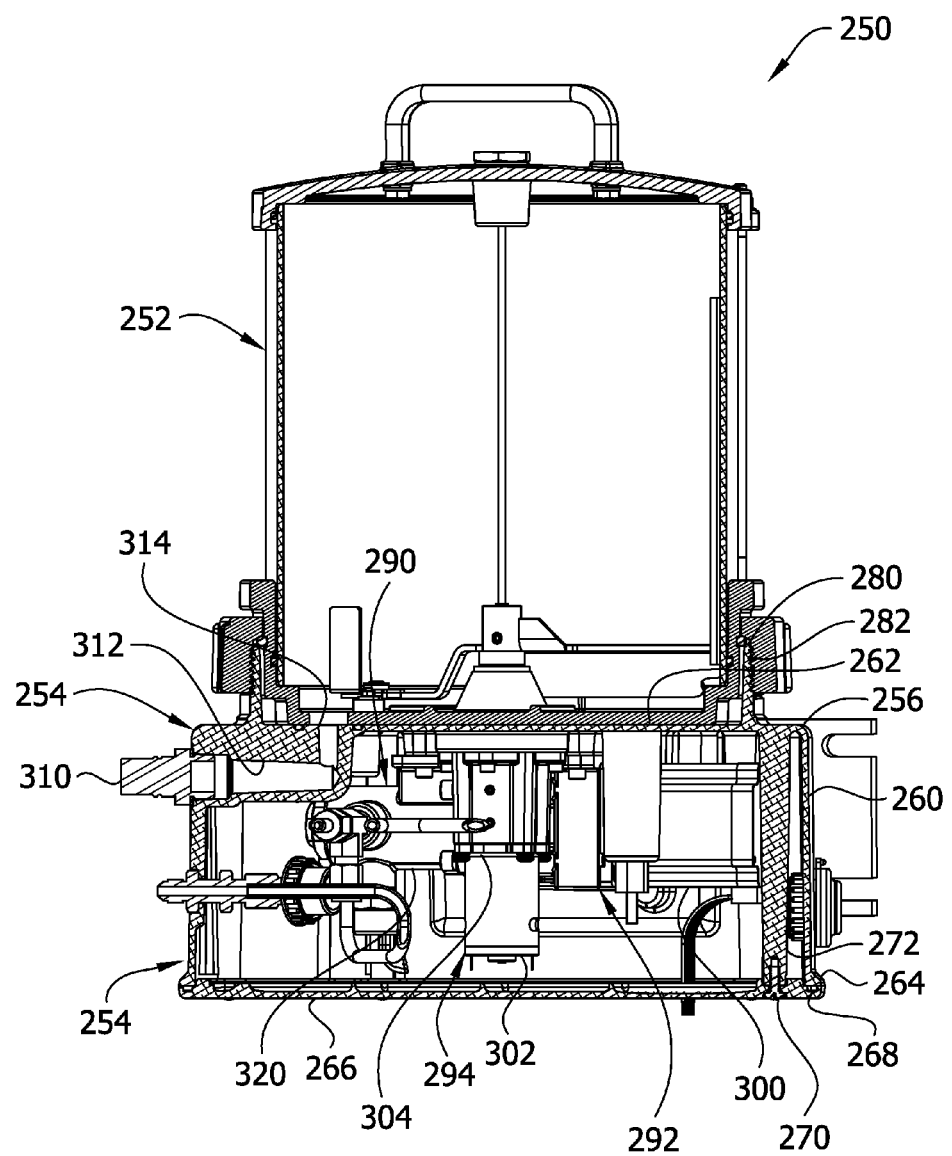
FIG. 5 is a vertical cross-section taken through the pumping system of FIG. 3.
Figure 6:
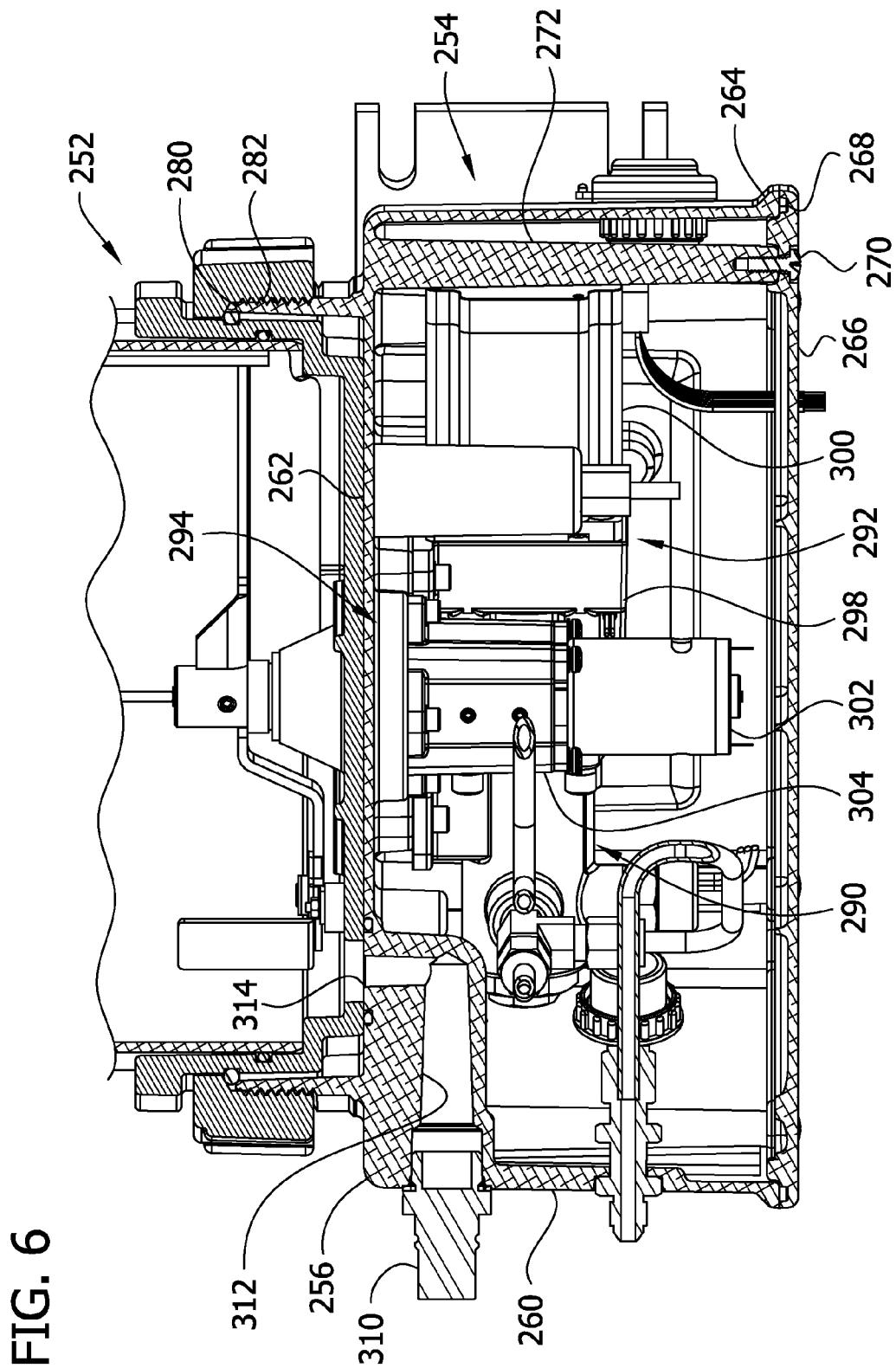
FIG. 6 is an enlarged portion of FIG. 5.

Referring to FIG. 5, the pump assembly 254 includes a housing 256 having a sidewall 260 forming a skirt extending downward from a top panel 262 to a lower flange 264 adapted to receive a removable bottom plate 266. As shown in FIG. 6, a gasket 268 is provided at an interface between the flange 264 and the bottom plate 266 to seal the interface. The bottom plate 266 is held in position by screw fasteners 270 threaded into corresponding bosses 272 provided on the housing 256. A circular collar 280 extends up from the top panel 262 and is sized for receiving the reservoir 252 to align the reservoir with the pump assembly 254. The collar 280 has a threaded exterior surface 282 for releasably connecting the reservoir 252 to the pump assembly 254 as will be explained in more detail below. As will be apparent to those skilled in the art, the collar 280 forms a connector on the pump assembly 254. Although the housing 256 may be made in other ways and from other materials without departing from the scope of the present invention, in one embodiment the housing is cast from metal such as aluminum.

As further illustrated in FIG. 6, the pump housing 256 contains various pump components of the pump assembly, including a pump, generally designated by 290, powered by a drive mechanism, generally designated by 292, and a stirrer drive mechanism, generally designated by 294. In the illustrated embodiment, the pump drive mechanism 292 drives the pump 290 and includes a linear drive mechanism 298 connected to a stepper motor 300. In the illustrated embodiment, the stirrer drive mechanism 294 comprises a separate stirrer motor 302 and a transmission 304. A return fitting 310 is provided on the housing 256 for joining a return line (not shown) that returns lubricant to the reservoir 252 when the lubricant pumping system 250 is used in a dual line system, as will be appreciated by those skilled in the art. A return passage 312 connects the return fitting 310 to a return opening 314 in the top panel 262 of the housing 256. The return opening 314 communicates with the reservoir 252 as will explained in greater detail below.

Figure 7:
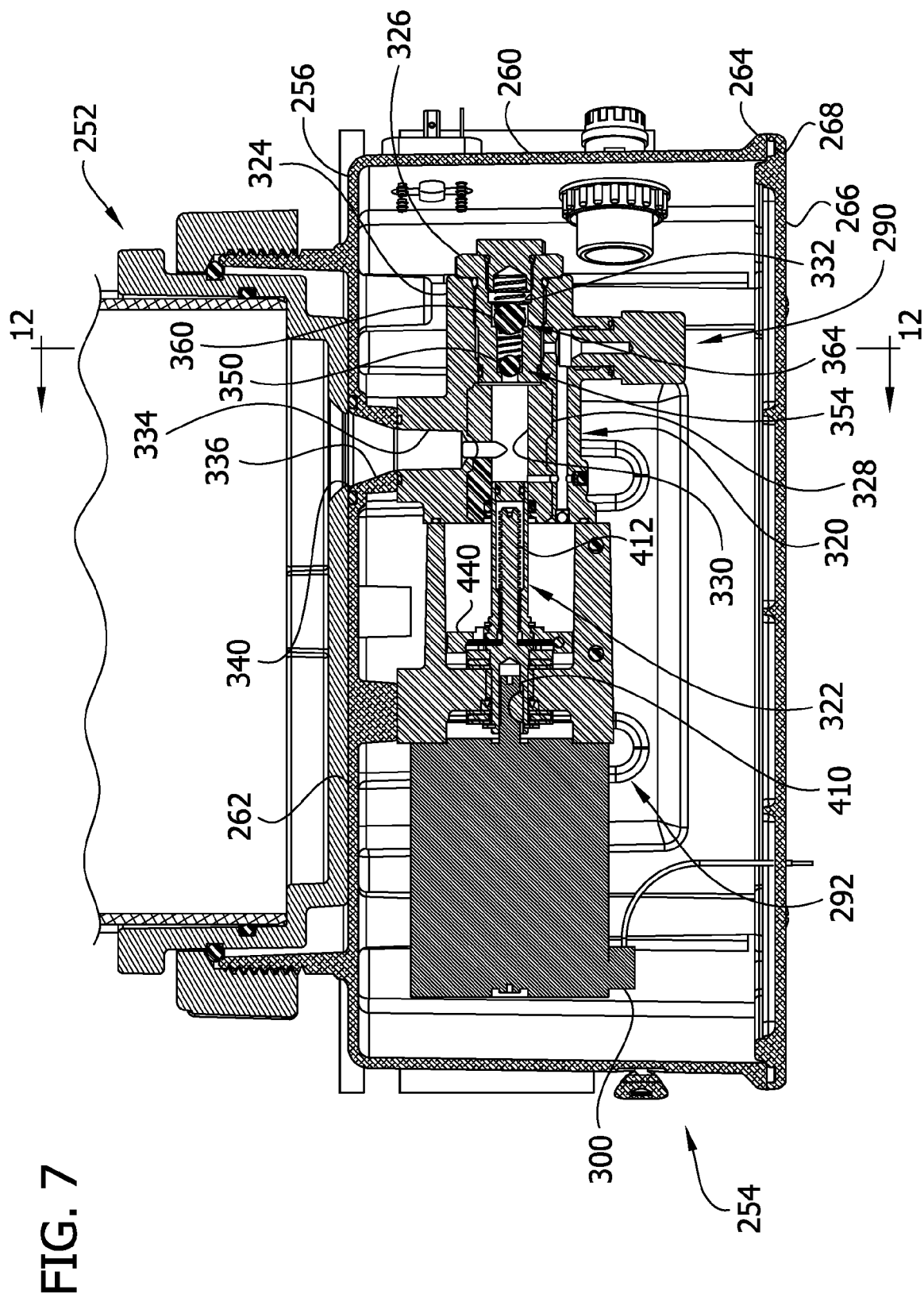
FIG. 7 is a vertical section taken through the pump assembly of FIG. 5 illustrating a linear drive mechanism of the pump assembly.
Figure 8:
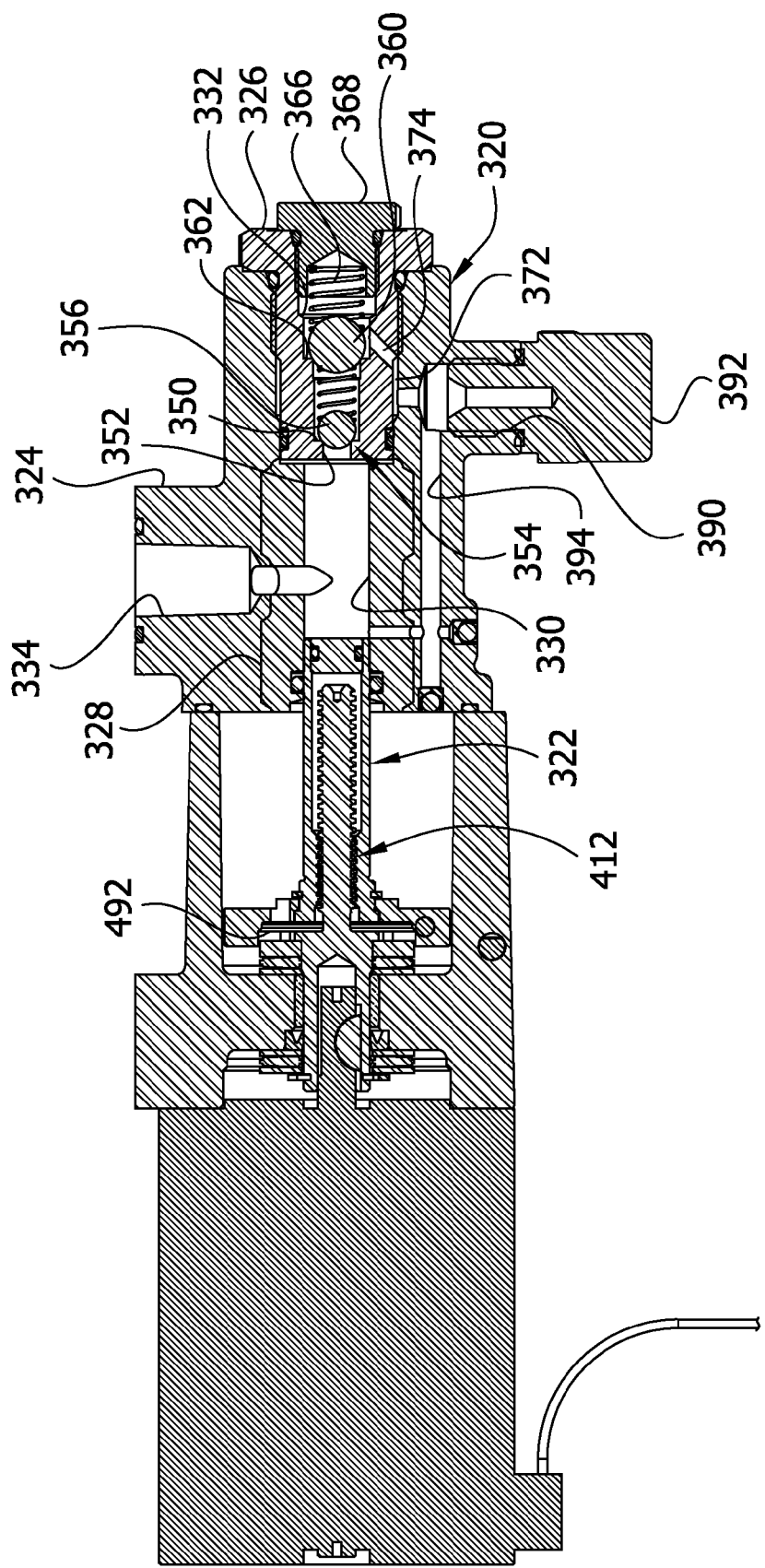
FIG. 8 is an enlarged portion of FIG. 7 illustrating the linear drive mechanism.

FIG. 7 shows the pump housing 256 sectioned in a different plane to illustrate components of the pump 290 and drive mechanism 292. The pump 290 includes a pump cylinder, generally designated by 320, and a piston, generally designated by 322, reciprocatively received in the cylinder. The pump cylinder 320 is mounted in the pump housing 256 immediately below the top panel 262. As shown in FIGS. 7 and 8, the pump cylinder 320 comprises a cylinder body 324 and a valve housing 326 in threaded engagement with the cylinder body. In the illustrated embodiment, the cylinder body 324 includes an insert 328 to reduce wear, but the body may be made unitary without departing from the scope of the present invention. The cylinder body 324 and valve housing 326 have co-axial bores indicated at 330 and 332, respectively, forming a longitudinal pump bore. The piston 322 reciprocates in the cylinder body bore 330, which in this embodiment has a nominal diameter of about 0.435 inch. The bore 332 in the valve housing 326 has multiple diameters to accommodate various check valve components as will be described below.

The cylinder body 324 has an inlet passage 334 extending from an inlet passage 336 formed in the top panel 262 of the housing 256. The inlet passage 336 extends to an opening 340 in the top panel 262 of the housing 256 that communicates with the reservoir 252 as will explained in greater detail below. The inlet passage 336 in the housing 256 and the inlet passage 334 in the cylinder body 324 are aligned so they form a continuous straight path extending vertically from the reservoir 252 to the bore 330 of the cylinder body 324. The total length of the vertical path is relatively short (e.g., less than four inches; preferably less than three inches, and even more preferably less than two inches).

Figure 9:
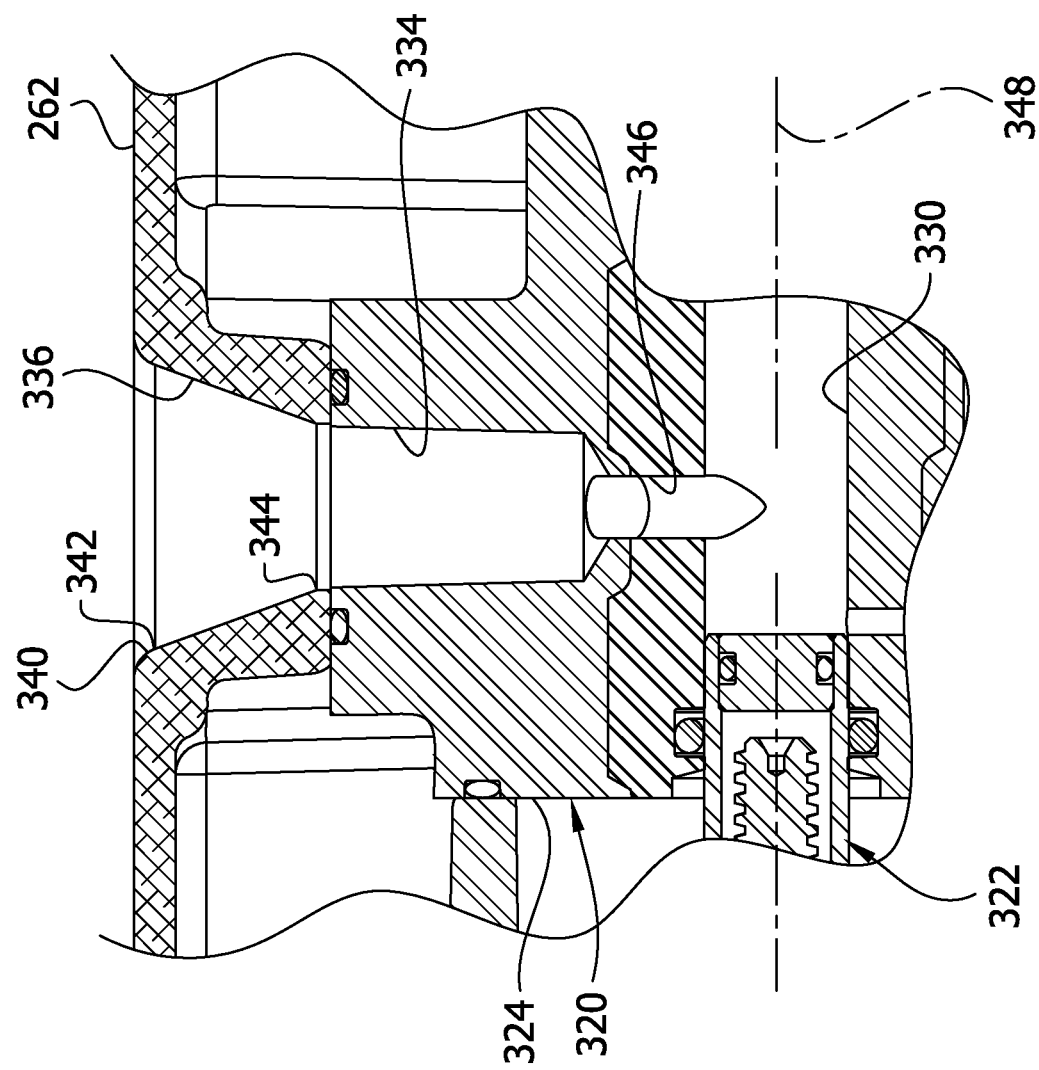
FIG. 9 is an enlarged portion of FIG. 7 showing a cylinder inlet of the drive mechanism.

Referring to FIG. 9, the inlet passage 336 in the top panel 262 of the pump housing 256 is generally conical tapering from a larger upper end (e.g., having a diameter of 1.033 in.) to facilitate lubricant flow into the pump assembly toward a smaller lower end (e.g., having a diameter of 0.500 in.) over a suitable axial length (e.g., 0.590 in.) The cylinder inlet passage 334 includes a generally cylindrical upper portion 342 having a suitable diameter (e.g., nominally 0.440 in. with a small draft angle to facilitate manufacture) and length (e.g., 0.840 in.) The passage 334 has a lower portion 346 that is oblong (e.g., racetrack shaped) as viewed from above (see FIG. 10), having a suitable major dimension (e.g., 0.435 in.) extending generally transverse to a longitudinal centerline 348 of the cylinder bore 330 about equal to a diameter of the cylinder bore and a suitable minor dimension (0.187 in.) less than the full diameter of the cylinder bore. The oblong configuration maximizes flow area into the cylinder bore 330 and reduces an effective length of the piston power stroke (i.e., the segment of a power stroke after the piston 322 passes the cylinder inlet passage 334 and blocks communication between the cylinder bore 330 and the inlet passage.) As a result, the pump assembly 290 is compact but pumps relatively large volumes of lubricant (e.g., at least 1.5 cubic centimeters) per stroke. The oblong lower portion 346 has a suitably short length (e.g., 0.125 in.)

Returning to FIG. 8, an upstream ball 350 is mounted in an upstream valve seat 352 along the bore 332 of the valve housing 326 to form an upstream check valve, generally designated by 354. The upstream ball 350 is moveable between a closed position (shown), in which the ball engages the upstream seat 352 to block flow through bore 332 during a return stroke of the piston 322, and an open position, in which the ball is spaced from the upstream seat to allow flow through the bore during a power stroke. An upstream coil compression spring 356 biases the upstream ball 350 toward its closed position. An end of the upstream spring 356 opposite the upstream ball 350 engages a downstream ball 360. The downstream ball 360 is mounted in a downstream valve seat 362 along the bore 332 of the valve housing 326 to form a downstream check valve, generally designated by 364. The downstream ball 360 is moveable between a closed position (shown), in which the ball engages the downstream seat 362 to block flow through bore 332 during the piston return stroke, and an open position, in which the ball is spaced from the downstream seat to allow flow through the bore during the power stroke. A downstream coil compression spring 366 biases the downstream ball 360 toward its closed position. An end of the downstream spring 366 opposite the downstream ball 360 engages a plug 368 threaded into the bore 332. Using two check valves 354, 364 instead of only one check valve reduces potential for lubricant to backflow into the cylinder body bore 330 during the piston return stroke.

Figure 10:
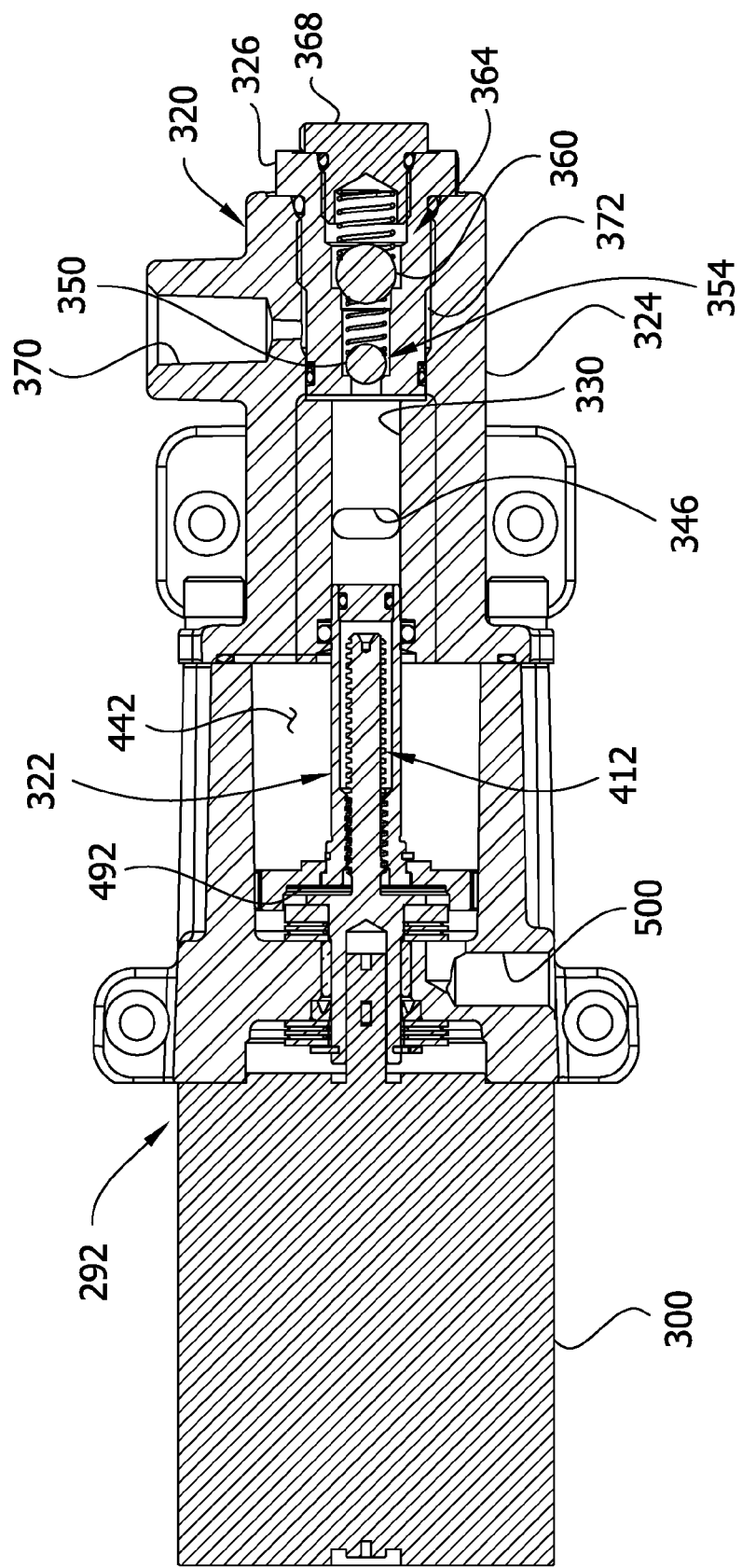
FIG. 10 is a view similar to FIG. 8 rotated 90° to illustrate an oblong portion of the cylinder inlet.
Figure 11:
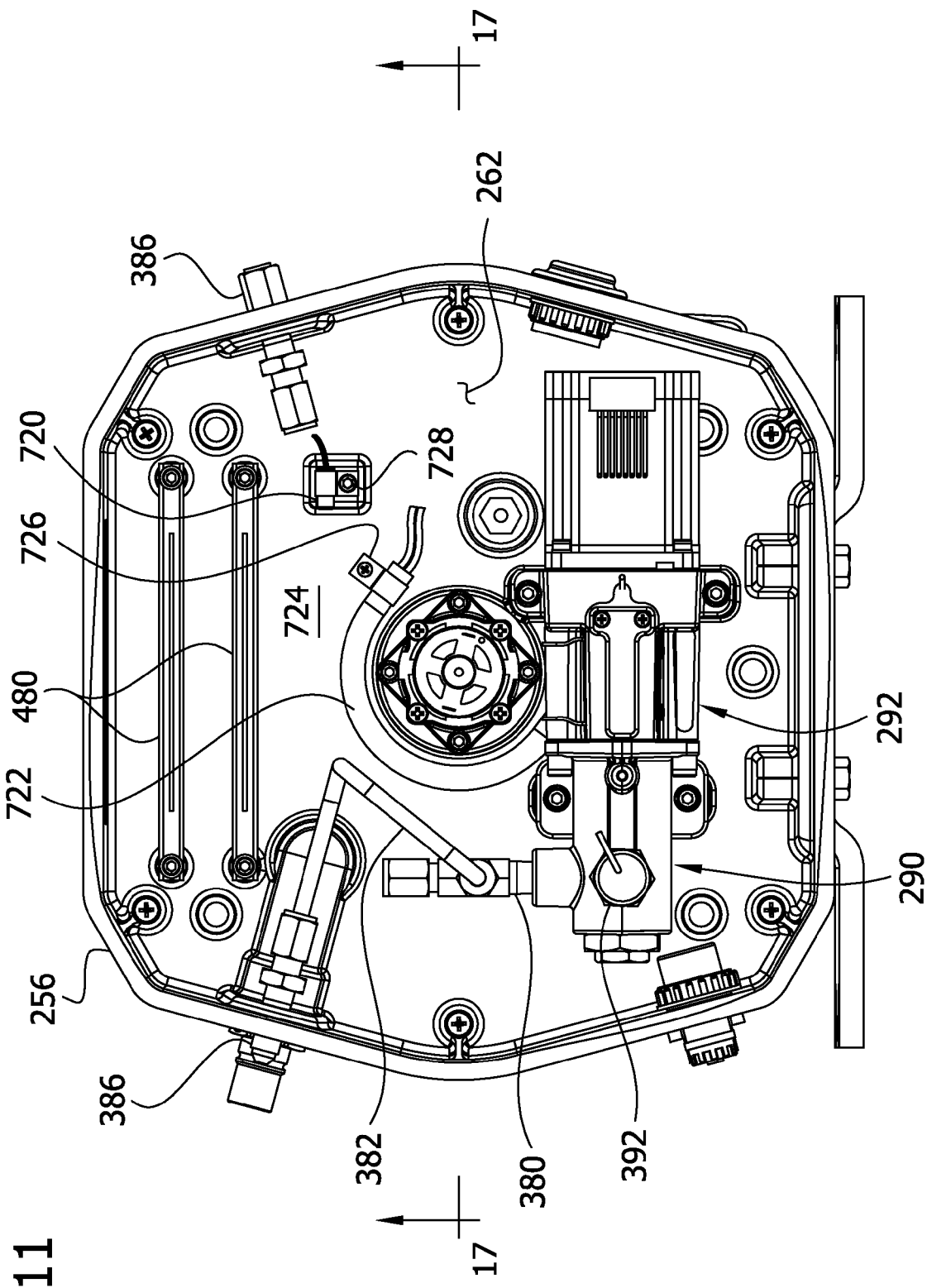
FIG. 11 is a bottom plan of the pump assembly of FIG. 3 having a bottom plate removed.
Figure 12:
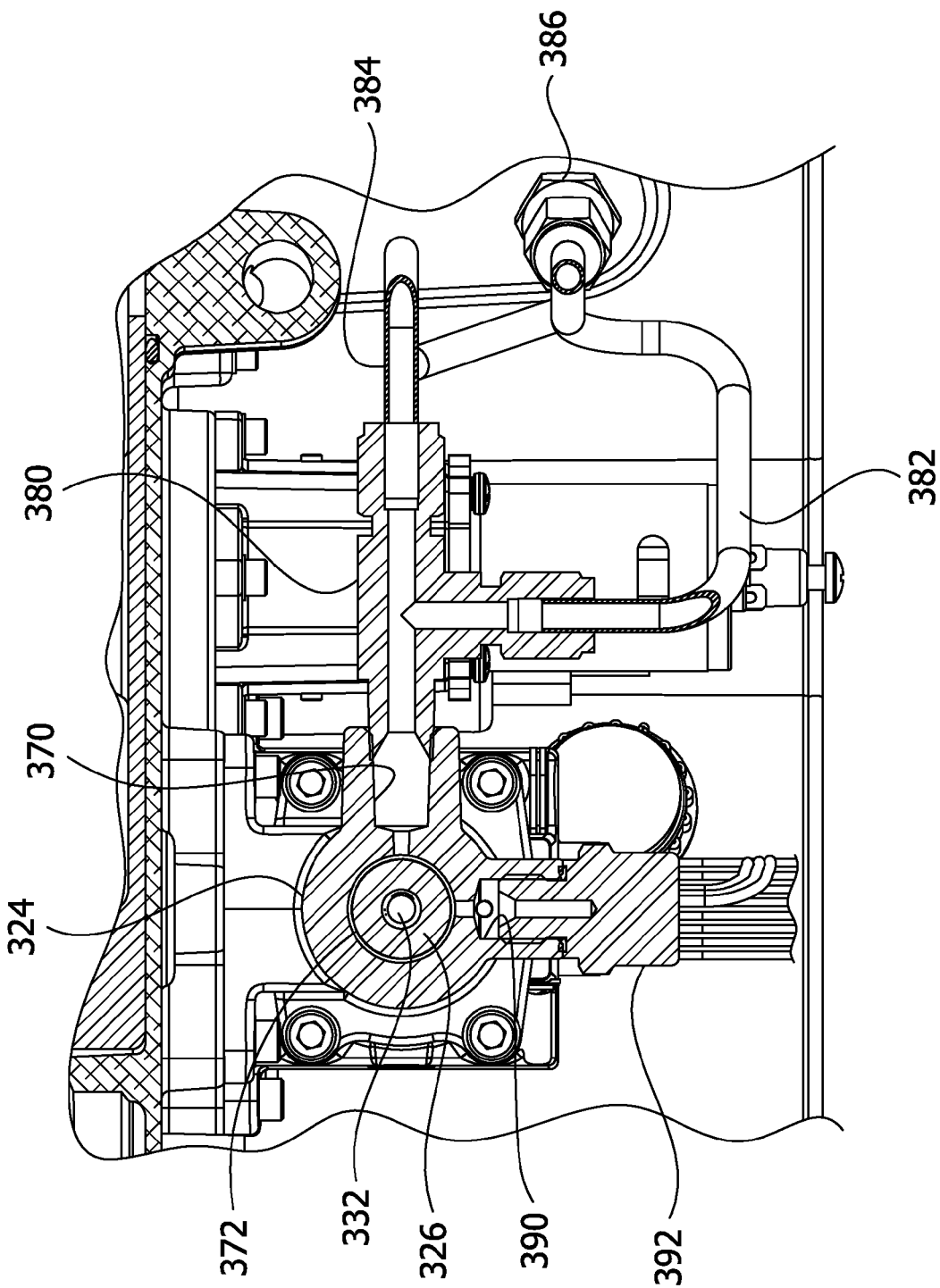
FIG. 12 is an enlarged vertical section taken in the plane of 12-12 of FIG. 7.

As illustrated in FIG. 10, the pump cylinder 320 has an outlet port 370 in the cylinder body 324 that communicates with the cylinder bore 330 via an annular gap 372 located between the valve housing 326 and the cylinder body 324 and via a connecting passage 374 (FIG. 8) extending between the annular gap and the bore 332 in the valve housing at a location downstream from the downstream check valve seat 362. As shown in FIGS. 11 and 12, a lubricant outlet fitting 380 is threaded into the outlet port 370. The outlet fitting 380 includes a junction permitting lubricant to flow into a first feed line 382 exiting the pump housing 256 at one location and to a second feed line 384 exiting the housing at a second location spaced from the first location. A self-sealing quick-connect coupling 386 is provided at a downstream end of each feed line 382, 384 to facilitate connecting the respective feed line to a lube supply line (not shown) for supplying lubricant to a distribution system of one kind or another. In general, only one of the two feed lines is used for any given distribution system. The particular feed line used is selected to provide a more suitable configuration for conditions in the field. However, both feed lines may be used in some installations.

Returning to FIG. 8, the cylinder body 324 also has a sensor port 390 communicating with the bore 330 by way of the annular gap 372 and the connecting passage 374. And as shown in FIG. 11, a pressure sensor 392 threaded in the sensor port 390 senses pressure at an outlet end of the cylinder bore 330.

As further shown in FIG. 8, a vent passage 394 in the cylinder body 324 provides fluid communication between the cylinder body bore 330 upstream from the upstream check valve seat 352 and the valve housing bore 332 downstream from the downstream check valve seat 362. The purpose of the vent passage 394 will become apparent below.

Figure 13:
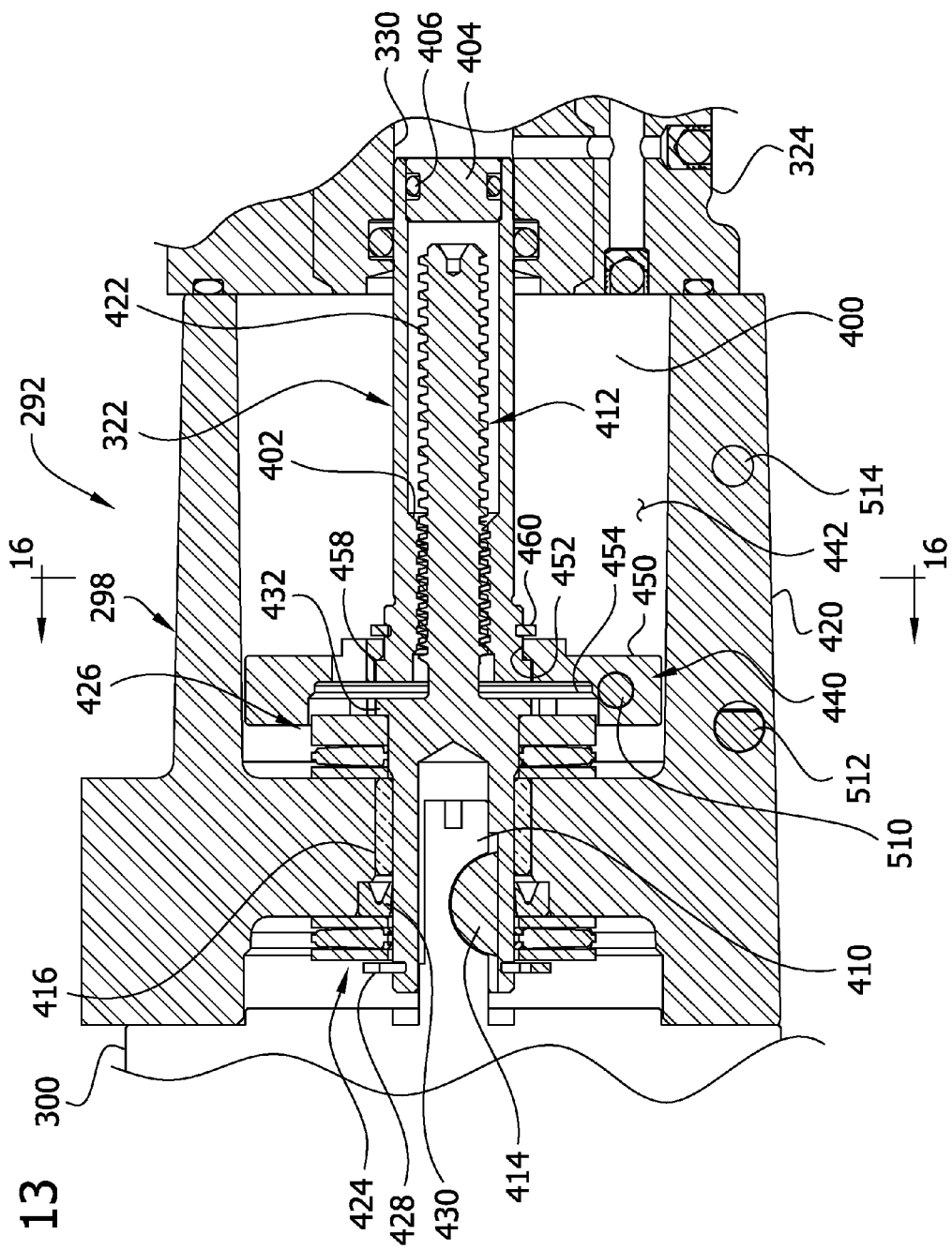
FIG. 13 is an enlarged vertical section showing components of the linear drive mechanism, including a lead screw, piston, and follower.

Referring to FIGS. 13-16, the piston 322 of the pump assembly 152 comprises a hollow cylindrical piston body 400 having a head end (i.e., toward the right as viewed in FIG. 13) and a tail end (i.e., toward the left as viewed in FIG. 13). Internal threads 402 extend through the piston body 400 from generally adjacent the tail end forward, terminating well short of the head end. The head end of the piston body 400 is closed by a piston head 404 having a circumferential seal 406 that seals against an inside surface of the body.

The pump drive mechanism 292 reciprocatively moves the piston 322 in the cylinder body bore 330. As mentioned previously, the drive mechanism 292 comprises a linear drive mechanism 298 connected to a stepper motor 300. The stepper motor 300 has an output shaft 410 that is connected to a lead screw 412 by a key 414. A bushing 416 provided on a follower housing 420 rotatably receives the lead screw 412 so the screw freely turns in the housing. The lead screw 412 has external threads 422 that mate with the internal threads 402 in the piston body 400. As the stepper motor output shaft 410 turns, the screw 412 drives the piston body 400 so it moves in the cylinder body bore 330. Although the mating threads 402, 422 on the piston body 400 and the lead screw 412 may be constructed in other ways without departing from the scope of the present invention, in one embodiment the threads are complementary full ACME threads capable of carrying a substantial load for pumping lubricant at high pressures.

As shown in FIG. 13, thrust loads exerted on the piston body 400 and lead screw 412 are carried by thrust bearings 424, 426 mounted on opposite sides of the follower housing 420. The first thrust bearing 424 supports forward axial loads (i.e., toward the right as viewed in FIG. 13) during a return stroke of the piston body 400 as it moves rearward in the cylinder bore 330. The first thrust bearing 424 is held captive between the follower housing 420 and a retaining ring 428 on the lead screw 412. A seal 430 mounted between the lead screw 412 and the follower housing 420 seals that interface to prevent leakage. The second thrust bearing 426 supports rearward axial loads (i.e., toward the left as viewed in FIG. 13) during a power stroke of the piston body 400 as it moves forward in the cylinder bore 330. The second thrust bearing 426 is held captive between the follower housing 420 and flange 432 on the lead screw 412.

As further shown in FIG. 13, a follower 440 is secured to the piston 412 for non-rotational linear movement in a cavity 442 in the follower housing 420. A front end of the follower housing 420 seals against the back end of the cylinder body 324 such that the cavity 442 is generally co-axial with the longitudinal centerline 348 of the cylinder bore 330 and the piston 322 extends from the follower housing cavity into the cylinder bore.

The follower 440 includes a circular follower body 450 having a central opening 452. The opening 452 has a larger diameter rearward portion 454 for accommodating the second thrust bearing 426. A recess 456 in the follower opening 452 receives protruding elements 458 at the trailing end of the piston body 400. The recess 456 and the protruding elements 458 have complementary non-circular shapes to prevent relative rotation between the piston body 400 and the follower 440. A retaining ring 460 received in a groove in the piston body 400 captures the follower 440 to prevent relative axial movement between the piston body and follower. Other constructions may be used to prevent relative rotational movement and axial movement between the piston body 400 and follower 440 without departing from the scope of the present invention.

Figure 16:
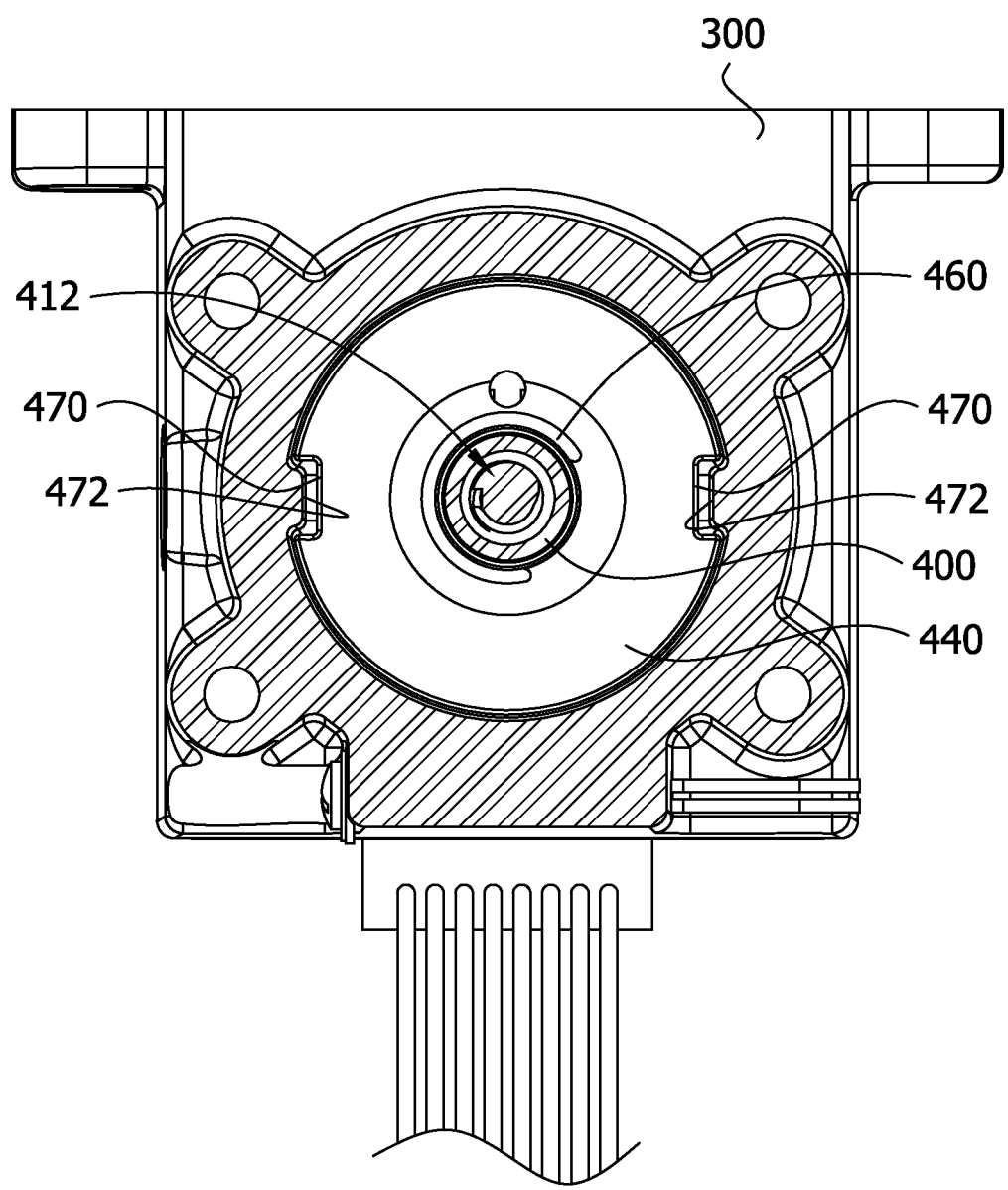
FIG. 16 is a vertical section taken in the plane of 16-16 of FIG. 13.

As illustrated in FIG. 16, the follower body 450 has notches 470 that receive stationary linear guide rails 472 in the housing cavity 442. The rails 472 extend generally parallel to the longitudinal centerline 348 of the cylinder bore 330, preventing the follower 440 (and piston body 400) from rotating as the lead screw 412 is rotated by the stepper motor 300. As a result, rotation of the stepper motor output shaft 410 and lead screw 412 in one direction causes the piston body 400 to move linearly in the cylinder bore 330 through a power stroke, and rotation of the output shaft and lead screw in an opposite direction causes the piston to move linearly in the cylinder bore through a return stroke. The lengths of the power and return strokes are controlled by operation of the stepper motor 300 under control of a controller, generally designated by 480 in FIG. 11. The controller and its operation are described in more detail in U.S. patent application Ser. No. 13/271,862, filed Oct. 12, 2011, and entitled, "PUMP HAVING STEPPER MOTOR AND OVERDRIVE CONTROL," which is incorporated by reference in its entirety.

Figure 14:
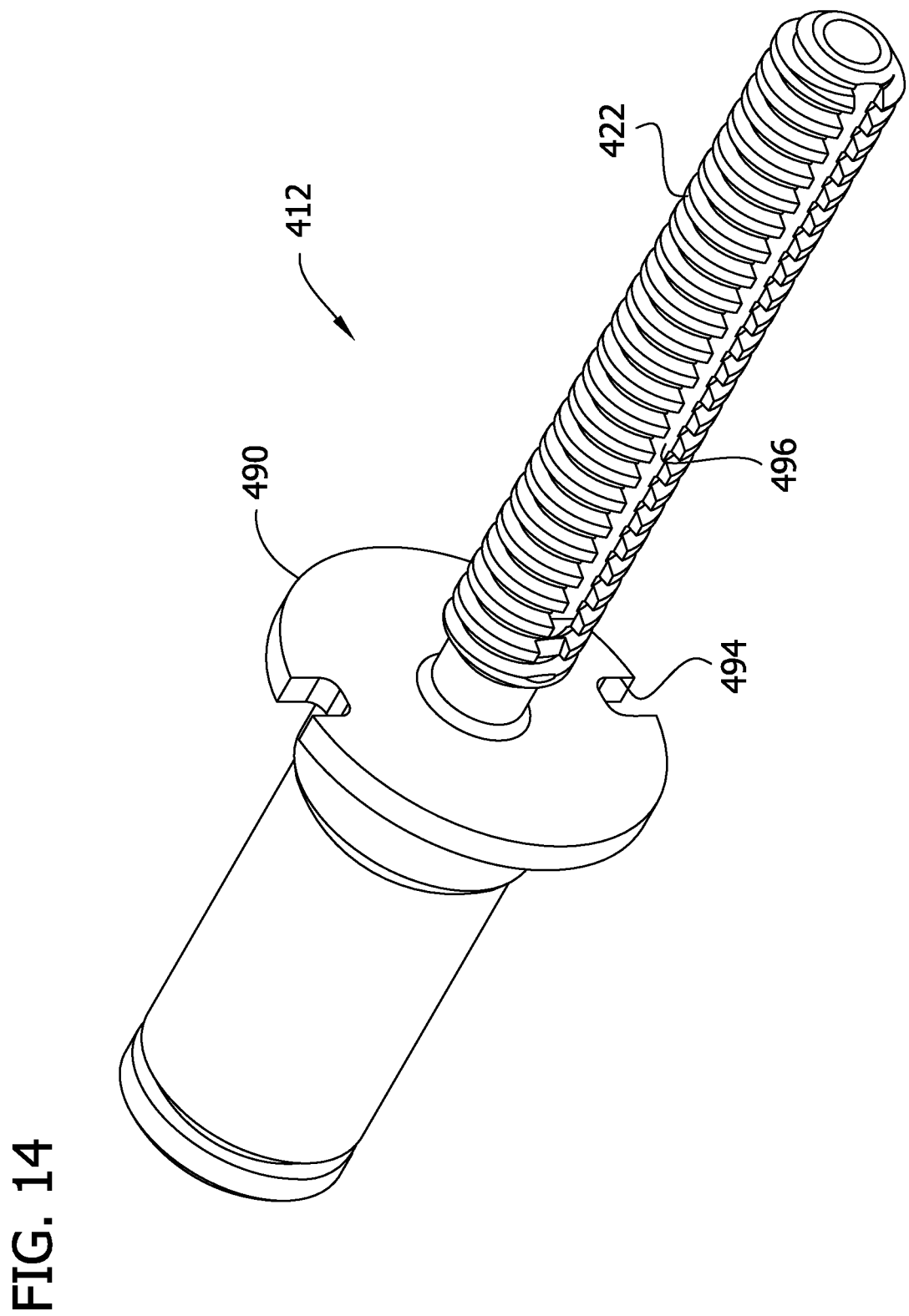
FIG. 14 is a perspective of the drive screw.
Figure 15:
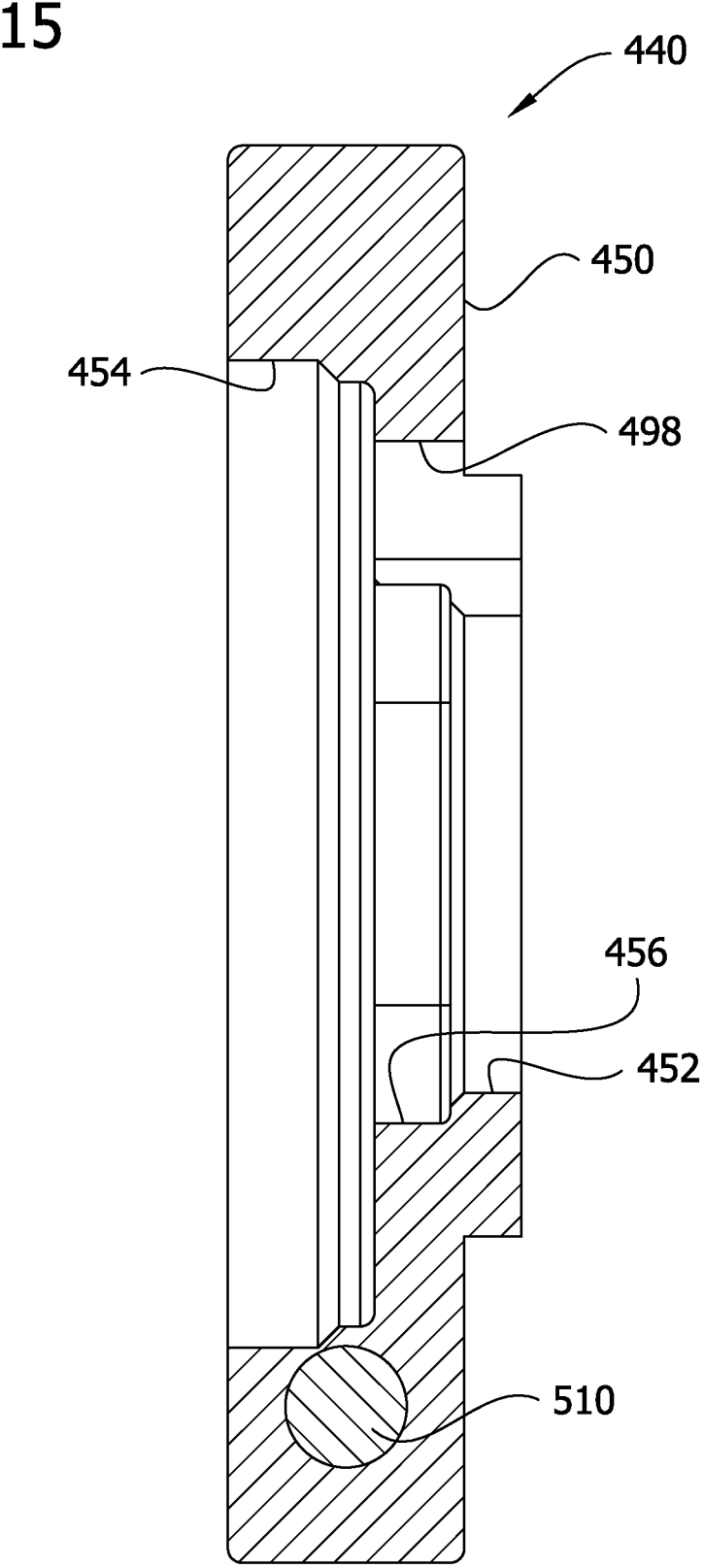
FIG. 15 is a sectional view of the follower.

The cavity 442 functions as a sump for holding a lubricant (e.g., oil) suitable for lubricating the mating threads 402, 422 on the piston body 400 and the lead screw 412. The lead screw 412 has the flange 490 sized to reach the oil in the sump. As the screw 412 rotates, the flange 490 carries oil up from the sump to a location above the lead screw, where the oil flows down a front face of the flange through a gap 492 between the flange and the trailing end of the piston body 400 and then to the thread 422 on the lead screw. Notches 494 provided on the flange 490 increase the amount of lubricant carried by the flange. Other oil-delivery mechanisms can be used without departing from the scope of the present invention. As shown in FIG. 14, an axial groove 496 through the thread 422 on the lead screw 412 allows excess lubricant to travel along the screw and through the gap 492 between the flange and the trailing end of the piston body 400 to the sump. A passage 498 extending longitudinally through the follower body 450 allows lubricant in the cavity 442 to flow past the follower 440 as the follower and piston body 400 reciprocate in the cavity. As shown in FIG. 10, the follower housing 420 has an inlet passage 500 for introducing a suitable supply of lubricant into the cavity 442. The inlet passage 500 can also be used to drain oil from the cavity.

Returning to FIG. 13, a magnet 510 on the follower 440 moves with the piston body 400. A pair of magnetic field sensors 512, 514 spaced along the follower housing 420 is used to sense a position of the magnet 510 on the follower 440 to calibrate operation of the stepper motor 300. It is envisioned that other linear position drive mechanisms can be used to reciprocate the piston body 400 in the cylinder bore 330 without departing from the scope of the present invention.

Figure 17:
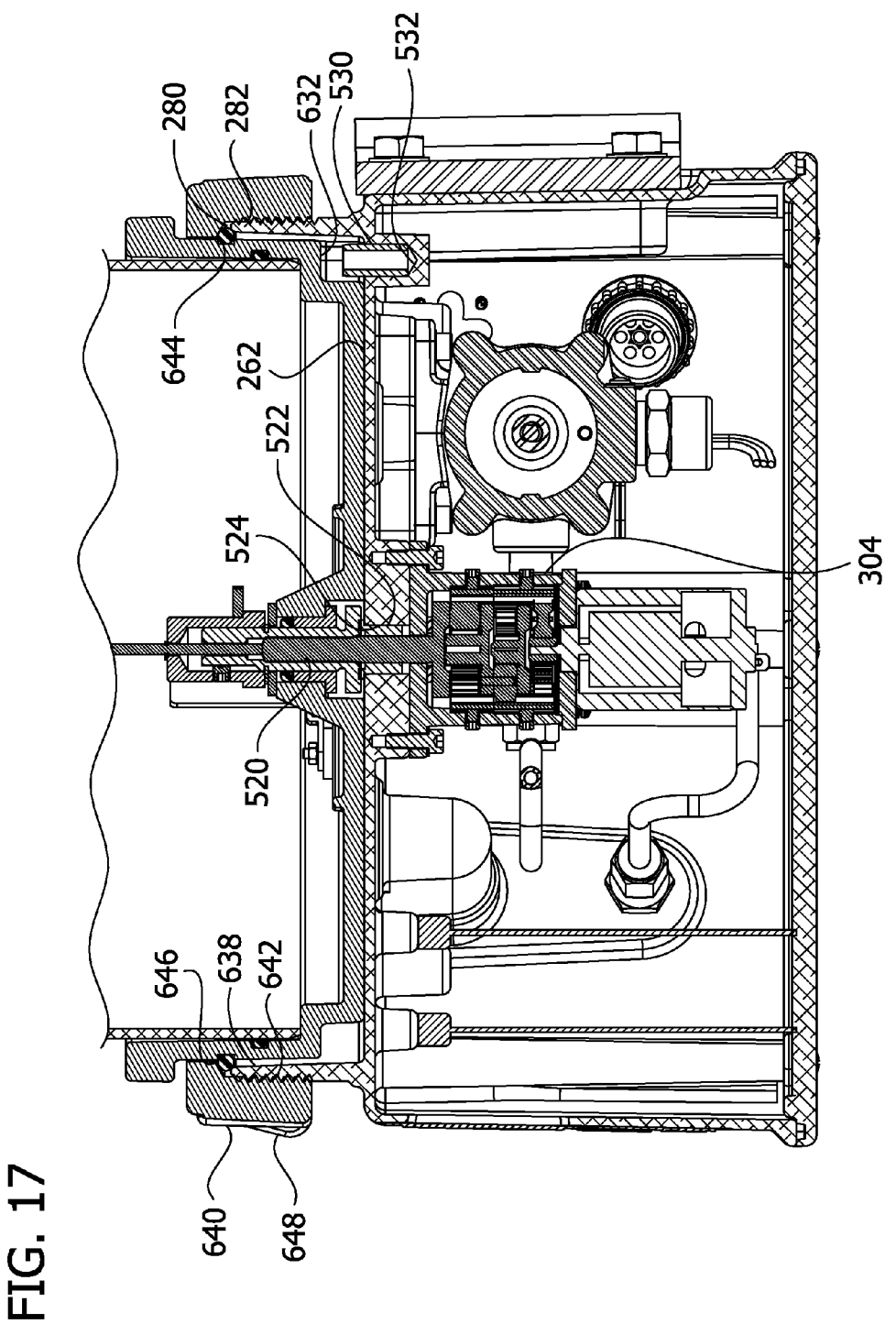
FIG. 17 is a fragmentary vertical section of the pumping system taken through the drive motor and related components.

As shown in FIG. 17, the stirrer drive transmission 304 includes an output shaft 520 extending upward through a bushing 522 mounted in an opening 524 in the top panel 262 of the pump assembly housing 256. The output shaft 520 has a non-circular (e.g., square or star-shaped) cross section. A clocking pin 530 mounted in a recess 532 in the top panel 262 extends upward from the housing 256.

Figure 18:
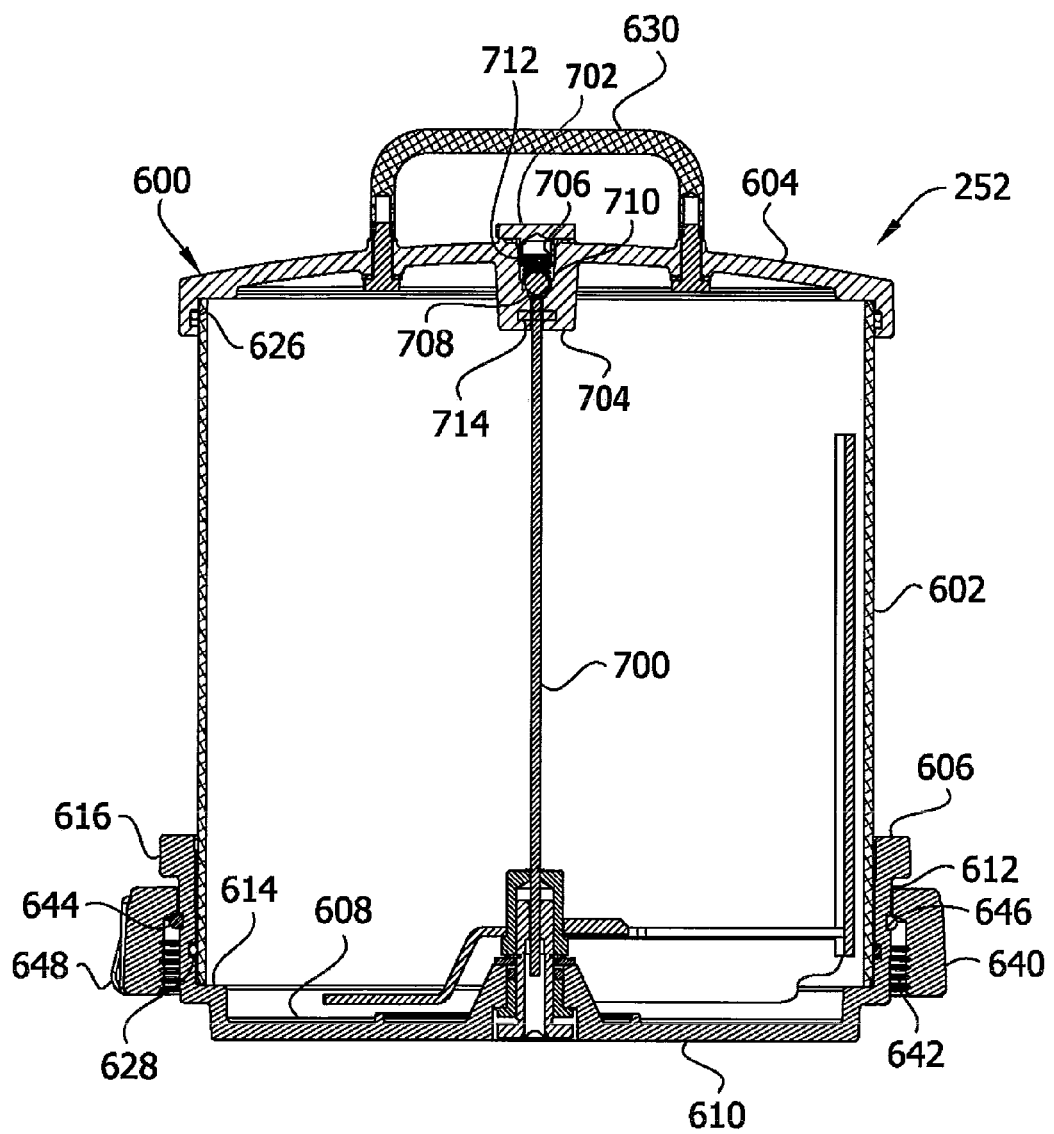
FIG. 18 is a vertical section of a reservoir of the present invention.
Figure 19:
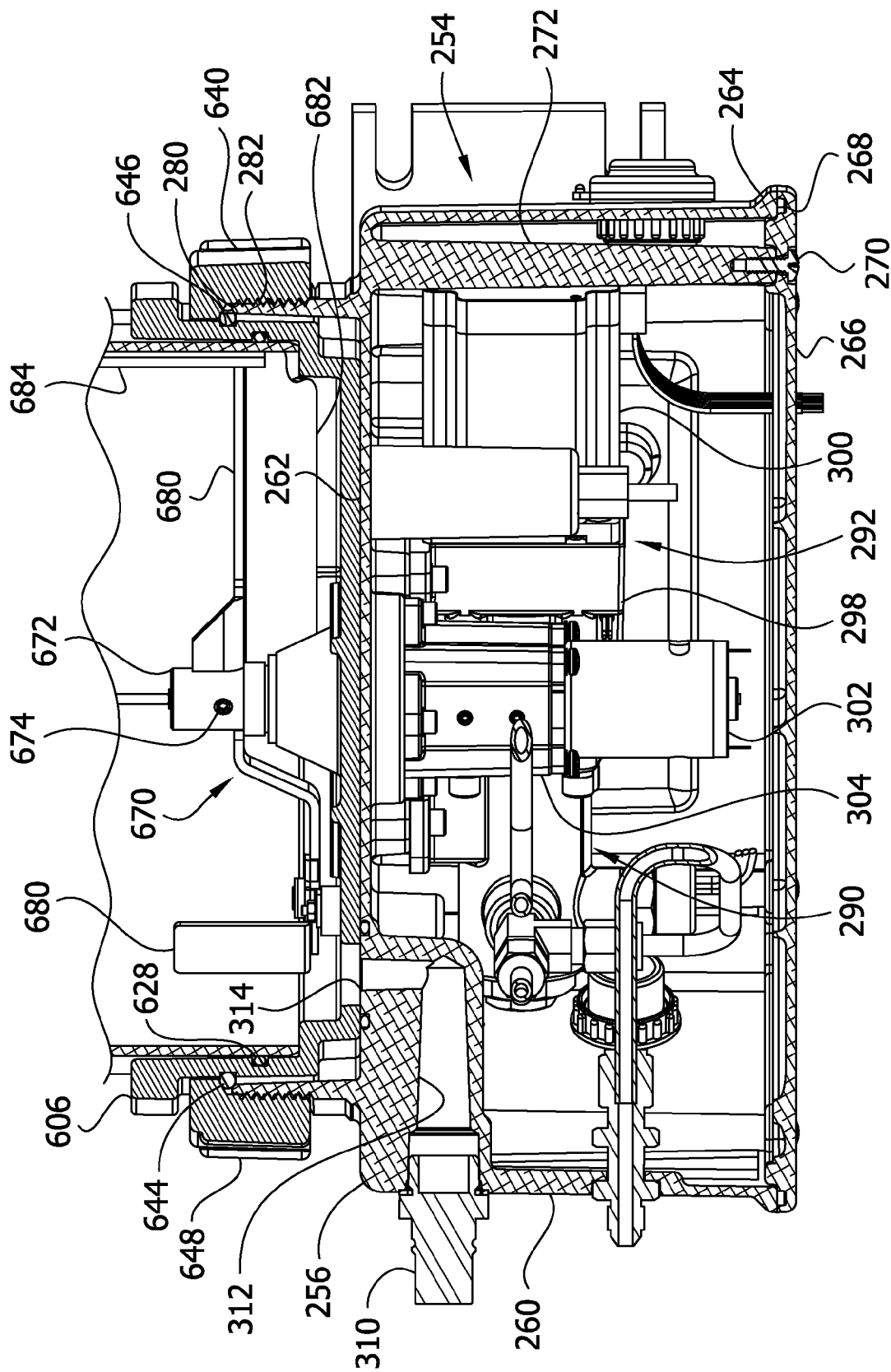
FIG. 19 is a cross-section of a portion of the pumping system of the present invention.
Figure 20:
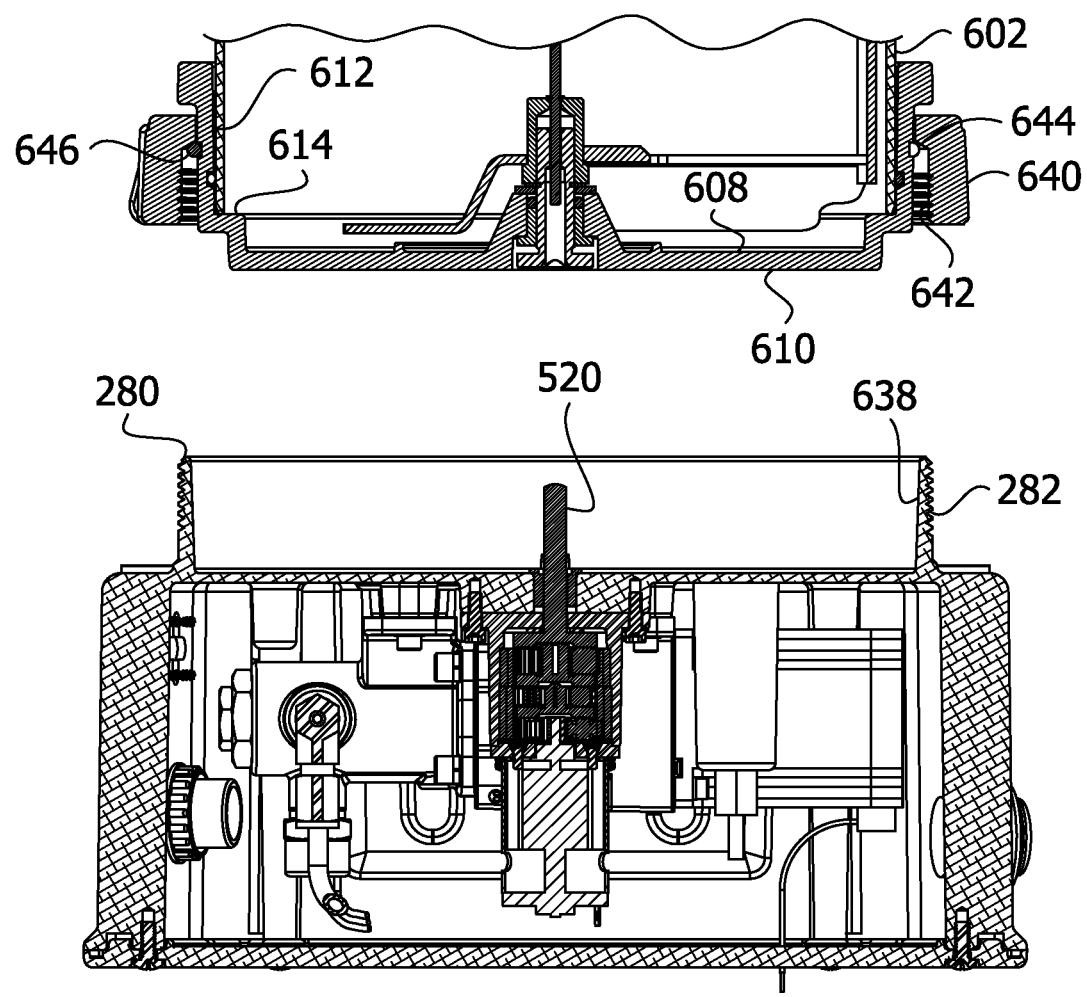
FIG. 20 is a cross-section of the pumping system showing the reservoir separated from the pump assembly.

Referring to FIGS. 18-20, the reservoir 252 for holding a supply of lubricant generally includes a tank 600 comprising a cylindrical tube 602, a top 604, and a bottom 606. The bottom 606 includes a bottom panel 608 having a flat lower face 610. A vertical sidewall 612 surrounds the bottom panel 608. The tube 602 rests on a raised land 614 formed on the bottom panel 608 inside the tank 600. A rim 616 is provided on the sidewall 612 opposite the bottom panel 608. In some embodiments, the tube 602 is visually transparent so presence of lubricant in the tank 600 can be visually confirmed. Returning to FIGS. 3 and 4, lugs 618, 620 extend radially outward from the top 604 and bottom 606, respectively. Each bottom lug 620 has a threaded hole for receiving a rod 622 that extends upward outside the tube 602. The rods 622 extend through corresponding holes in the lugs 618 on the top 604. Nuts 624 threaded on upper ends of the rods 622 hold the top 604 and bottom 606 in position on the tube 602. As shown in FIG. 18, seals 626, 628 are positioned between the tube 602 and the top 604 and bottom 606, respectively, to ensure lubricant does not leak from the corresponding joints. A handle 630 is provided on the top 604 for lifting and carrying the reservoir 252 when separated from the pump assembly 254. A recess 632 (FIG. 17) is provided in the bottom 606 for receiving the clocking pin 530 on the pump assembly housing 256 when the reservoir 252 is properly oriented with the housing so openings 634, 636 (FIG. 22) in the bottom are aligned with the return passage opening 314 (FIG. 6) and inlet passage opening 340 (FIG. 7) in the top panel 262 of the housing. The first opening 634 constitutes a return or refill opening for providing fluid communication between an interior of the tank 600 and the return passage opening 314. The second opening 636 constitutes an outlet opening for providing fluid communication between an interior of the tank 600 and the inlet passage opening 340 in the top panel 262 of the housing. The reservoir 252 and pump assembly 254 can have other types of clocking features without departing from the scope of the present invention.

Returning to FIG. 17, the collar 280 extending upward from the pump assembly housing 256 has an interior surface 638 defining a recess sized for receiving a lower portion of the sidewall 612 of the reservoir bottom 606. A locking ring 640 rotatably mounted on the bottom 606 of the reservoir 252 includes an internally threaded surface 642 that mates with the threaded exterior surface 282 of the collar 280 to fasten the reservoir to the pump assembly 254. As will be apparent to those skilled in the art, locking ring 640 forms a connector on the reservoir 252. The locking ring 640 is held in position on the bottom 606 of the reservoir 252 by a retaining ring 644 mounted in a circumferential groove 646 extending around the bottom. The locking ring 640 includes ribs and/or wings 648 (FIGS. 3 and 4) for grasping the ring during tightening and loosening. Although the locking ring 640 and collar 280 of the illustrated embodiment include mating threads, those skilled in the art will appreciate that other fastener types (e.g., bayonet fasteners) may be used on the respective connectors without departing from the scope of the present invention.

Figure 21:
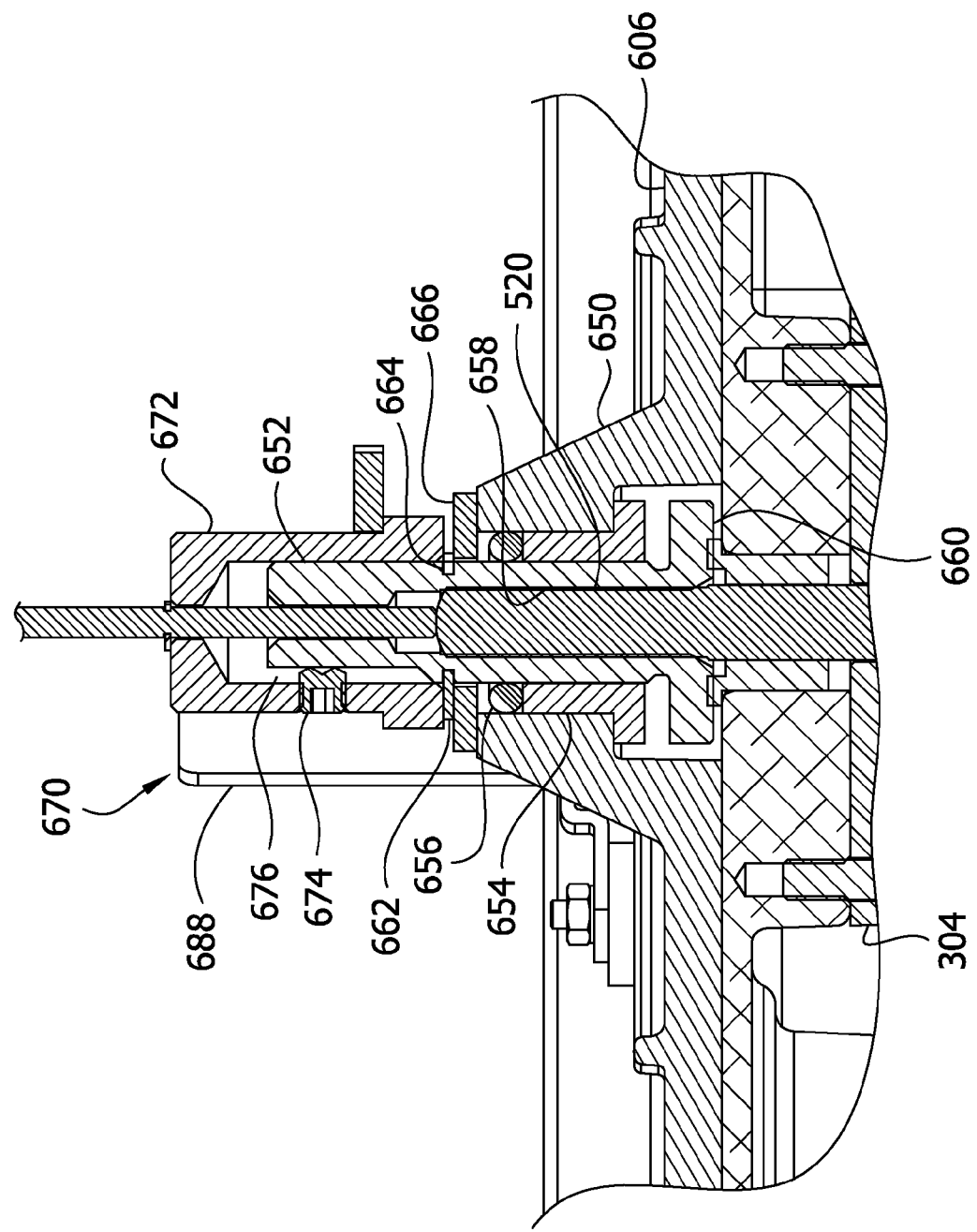
FIG. 21 is an enlarged vertical section, illustrating a force-feed mechanism on the stirrer.

As illustrated in FIG. 21, a central hub 650 extends upward from the bottom 606 of the reservoir 252. A sleeve 652 extends through a bushing 654 and seal 656 mounted in the hub 650. The sleeve 652 has a non-circular central bore 658 sized for receiving the output shaft 520 of the stirrer drive transmission 304. The bore 658 and shaft 520 have complementary shapes so the sleeve 652 turns with the output shaft of the stirrer drive mechanism transmission 304. The sleeve 652 is held in the hub 650 by a flange 660 at its lower end and by a retainer ring 662 mounted in a groove 664 provided on the sleeve 652. The retainer ring 662 rests on a washer 666 that surrounds the sleeve 652 and abuts the hub 650.

As shown in FIG. 21, a stirrer, generally designated by 670, is provided for stirring lubricant in the reservoir 252. The stirrer 670 comprises a rotor hub 672 connected to the sleeve 652 with a set screw 674. The sleeve 652 includes a flat land 676 on one side for receiving the screw 674. An arm 680 extends radially outward from the rotor hub 672 across the bottom 606. The arm 680 includes a wiper 682 angling down toward the bottom 606 and a blade 684 extending up inside the tube 602. The wiper 682 forces lubricant down through the outlet opening 636 of the reservoir 252.

Figure 22:
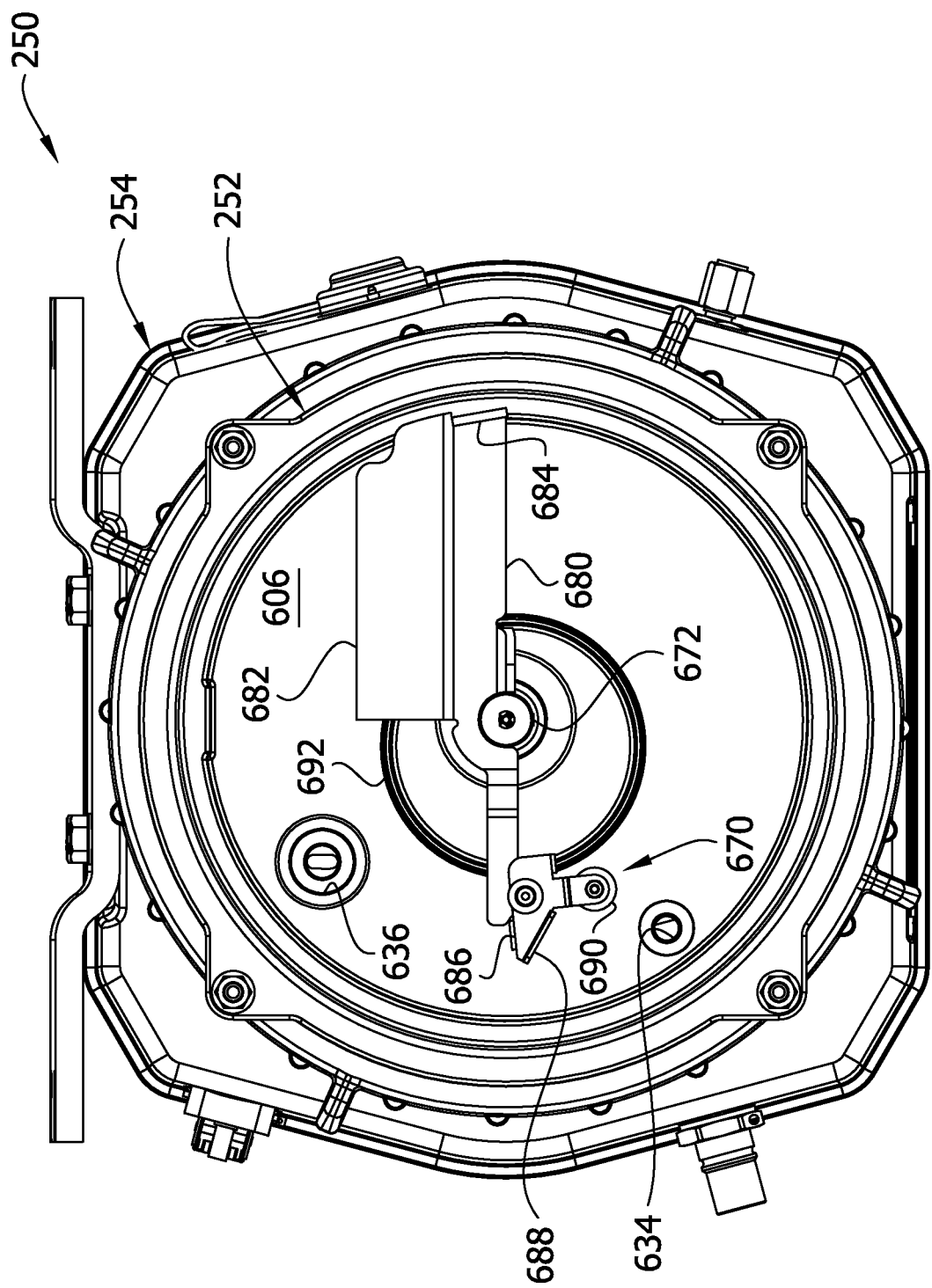
FIG. 22 is a top plan of a bottom of a reservoir of the present invention.

As illustrated in FIG. 22, a stirrer assembly 686 is pivotally mounted on an opposite end of the arm 680 for fluidizing lubricant in the reservoir 252. The stirrer assembly 686 includes a paddle 688 extending upward from the arm 680. The paddle 688 travels through the lubricant to fluidize the lubricant. The paddle 680 swings with respect to the arm 680 as the arm rotates, driven by a cam follower 690 that rides along a ridge 692 on the bottom 606 of the reservoir 252 forming a cam, to fluidize the lubricant.

Returning to FIGS. 17 and 18, a lifter 700 extends upward through holes in the sleeve 652 and rotor hub 672 to a check valve assembly 702 mounted on the top 604. The lifter 700 is slidably receiving in the holes in the sleeve 652 and rotor hub 672. The check valve assembly 702 includes a housing 704 having a central bore 706. A ball 708 is received in a valve seat 710 formed along the bore 706 of the valve housing 704. The ball 708 is moveable between a closed position (shown in FIG. 19) in which the ball engages the seat 710 to block flow through bore 706 when the reservoir 252 is removed from the pump assembly 254 and an open position (not shown) in which the ball is spaced from the seat to allow flow through the bore so the reservoir can vent. A coil compression spring 712 biases the ball 708 toward its closed position.

When the reservoir 252 is removed from the pump assembly 254, the spring 712 biases the ball 708 toward the seat 710, preventing the reservoir 252 from venting. Due to the viscosity of the lubricant in the reservoir 252, the lubricant does not drain through the outlet opening 636 of the reservoir when the ball is blocking the bore 706. When the reservoir 252 is seated on the pump assembly 254, the output shaft 520 of the stirrer drive transmission 304 engages the lifter 700, forcing it upward so its upper end disengages the ball 708 of the check valve assembly 702 from its seat 710, allowing the reservoir to vent through the bore 706 and lubricant to flow through the outlet opening 636. A flange 714 at an upper end of the lifter 700 holds the lifter in the reservoir 252 when the reservoir is removed from the pump assembly 254.

Returning to FIG. 11, a temperature sensor 720 is mounted on a boss extending downward from the top panel 262. A heater 722 (e.g., a 100 watt cartridge resistance heater) is also mounted inside the pump housing 256. In the illustrated embodiment, the heater 722 is mounted on a lower face 724 of the top panel 262. Although the heater 722 may be mounted to the lower face 724 of the top panel 262 by other means, in the illustrated embodiment, the heater is fastened to the top panel with a conventional tubing clamp 726. Similarly, the sensor 720 may also be fastened to the top panel 262 with a conventional tubing clamp 728.

The temperature sensor 720 is connected to the controller 480. The heater 722 may be energized before start up or upon receiving a signal from the temperature sensor 720 indicating a temperature less than a predetermined minimum temperature (e.g., 20° F.). Desirably, the pump assembly housing 256 is made from a thermally conductive material such as aluminum, and the bottom 606 of the reservoir 252 is made of a thermally conductive material such as aluminum so that heat energy from the heater 772 heats lubricant in the reservoir 252 to maintain the lubricant at a suitable viscosity for pumping.

To promote thermal conduction across this interface between the reservoir 252 and the pump assembly housing 256, the lower face 610 (FIG. 18) of the reservoir bottom 606 and an upper face 730 (FIG. 17) of the pump assembly housing top panel 262 are contoured, sized, and shaped for face-to-face contact with each other. In one embodiment, the opposing faces are planar to ensure face-to-face contact. By way of example, an area of the lower face 730 of the reservoir bottom 606 in contact with the upper face 732 of the pump housing top panel 262 may represent at least 70%, or at least 75%, or at least 80%, of the overall surface area of the lower face of the bottom of the tank.

The controller 480 of the pump assembly 254 initiates operation of the stirrer motor 302 before the pump motor 300 is operated to reciprocate the piston 322. This sequence allows the stirrer 670 to fluidize the lubricant and prime the pump 290 with lubricant before actual lubricant pumping begins, which can be especially advantageous if the lubricant is in a viscous condition, as in cold-temperature environments. After a suitable delay of predetermined length (e.g., eight to twelve seconds), the pump motor 300 is energized to move the piston 322 through a succession of one or more power and return strokes to pump the desired amount of lubricant through the feed line 382 or 384 connected to the distribution supply line.

When the pump assembly 254 is operated in a non-venting mode, the piston 322 moves forward in the cylinder bore 330 through a power stroke to push lubricant from the cylinder bore and rearward through a non-venting return stroke during which the piston stops short of the location at which the vent passage 394 communicates with the cylinder bore. In other words, the limit of the return stroke is downstream from the location where the vent passage 394 communicates with the cylinder bore 330. As a result, the vent passage 394 does not communicate with the tank 600, and the distribution system is not vented during a return stroke of the piston. As explained earlier, such venting is unnecessary in a progressive (divider) valve distribution application.

If the pump assembly 254 is used with an injector distribution system, requiring venting, the controller 480 of the pump assembly is programmed to pump the desired amount of lubricant through a lube supply line to a plurality of injectors at desired intervals of time. The injectors operate to deliver metered amounts of lubricant to respective points of lubrication (e.g., bearings). In this mode, the pump assembly 254 operates as described above except that the piston 322 moves forward in the cylinder bore 330 through a power stroke to pump lubricant from the cylinder bore and rearward through a venting return stroke, during which the piston moves past the location at which the vent passage 394 communicates with the cylinder bore. In other words, the limit of the return stroke is upstream from the location at which the vent passage 394 communicates with the cylinder bore 330. As a result, the vent passage 394 communicates with the tank 600, and lubricant is vented upward through the inlet passages 334, 336 to the tank to allow the injectors to reset for the next lube event.

Thus, the piston 322 of the pump assembly 254 is movable through both venting and non-venting return strokes, depending on whether the distribution system being supplied with lubricant requires venting between lubrication events. In the embodiment described above, a venting return stroke of the piston 322 is somewhat longer than a non-venting return stoke of the piston.

The pump assembly 254 is capable of pumping viscous lubricants at relatively low temperatures. This is due, at least in part, to the strong push/pull forces exerted on the lubricant to force lubricant from the reservoir directly into the cylinder bore 330. Rotation of stirrer 670 causes the wiper 682 to exert a strong downward force on lubricant in the tank 600 tending to push it along the inlet passages 334, 336 to the cylinder bore 330. Further, a return stroke of the piston 332 generates a force tending to pull this same lubricant along the same inlet passages 334, 336. The combination of these pushing and pulling forces is effective for moving viscous lubricant into the cylinder bore at lower temperatures. Further, the heater 722 may be used to raise the temperature of lubricant in the reservoir 242 to reduce its viscosity for pumping.

Figure 23:
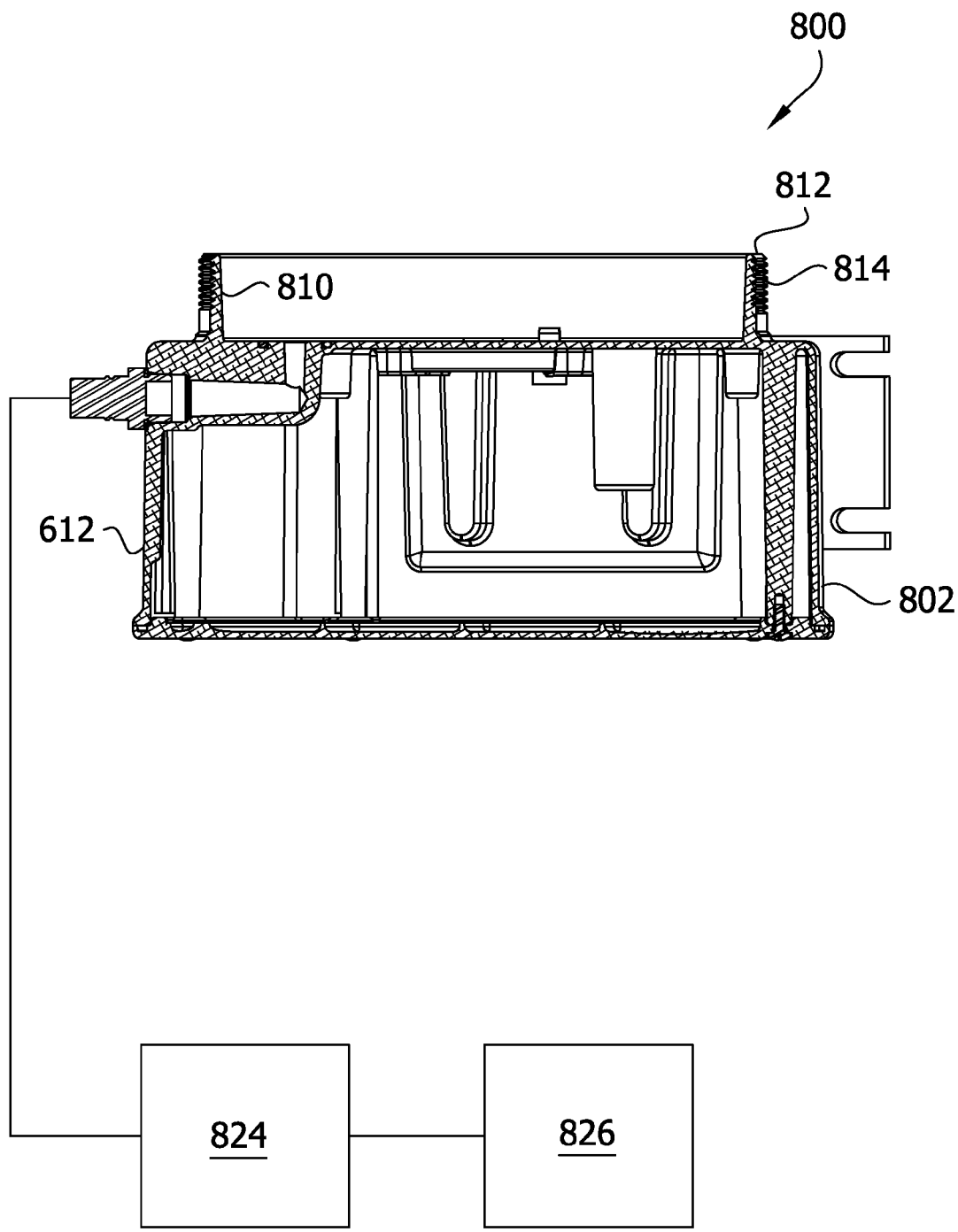
FIG. 23 is a vertical cross-section of a refilling station of the present invention.
Figure 24:
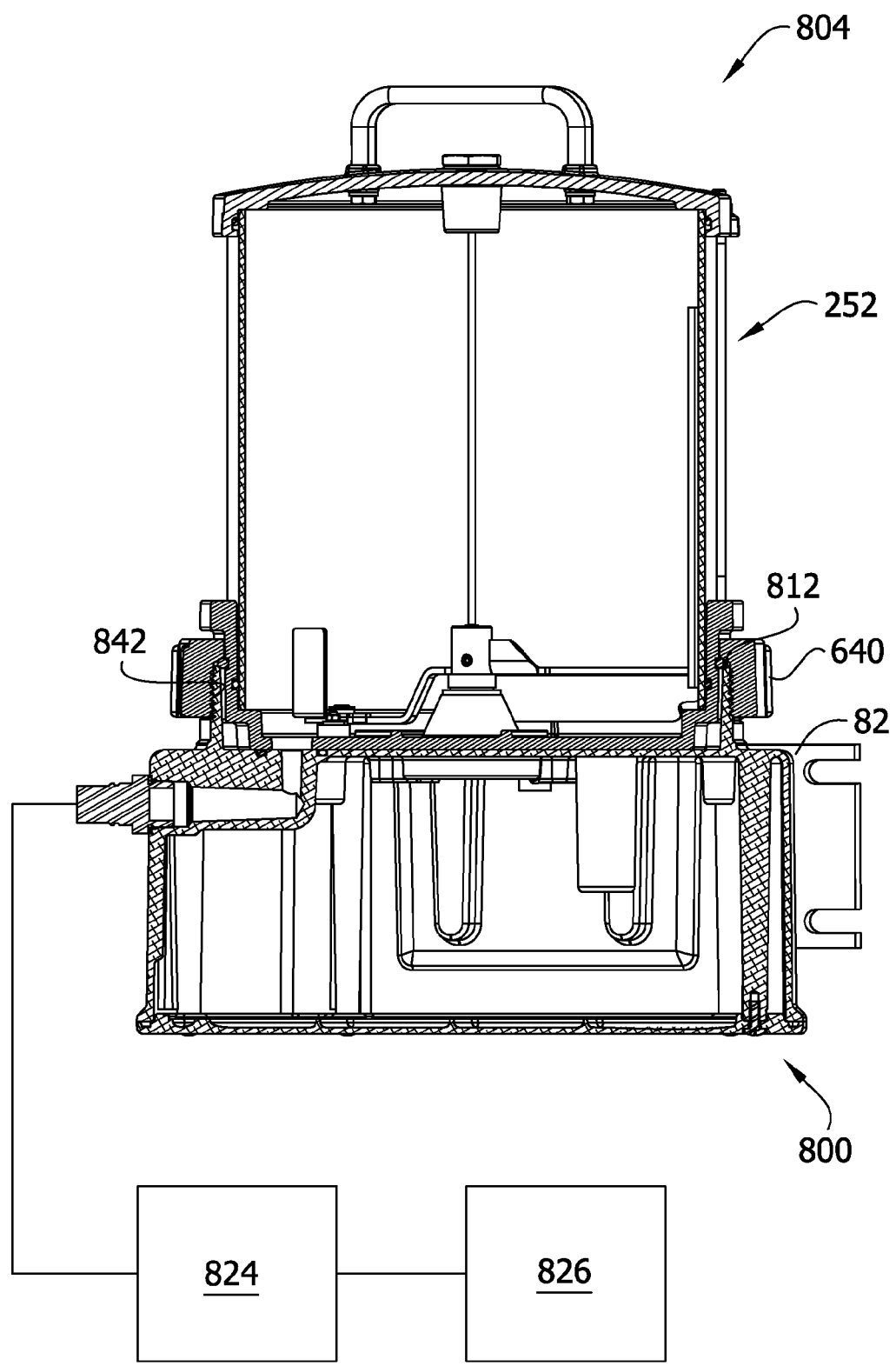
FIG. 24 is a vertical cross-section of a refilling system of the present invention.

When lubricant in the reservoir 252 is expended, the reservoir may be removed and replaced with a reservoir containing a fresh supply of lubricant. The empty reservoir 252 can be refilled using a lubricant reservoir refilling station 800 as shown in FIG. 23. The refilling station 800 includes a refill housing 802 substantially identical to the pump assembly housing 256 described above except that the outlet opening 636 is blocked. The empty reservoir 252 is positioned on the refill housing 802 of the refilling station 800 as shown in FIG. 24 so the lower portion of the sidewall 612 of the reservoir bottom 606 is positioned in the recess defined by the interior surface 638 of the collar 280 extending upward from the housing. The locking ring 640 is rotated relative to the bottom 606 of the reservoir 252 engaging the internally threaded surface 642 on the ring with the threaded exterior surface 282 of the collar 280 to fasten the reservoir to the station 800 and form a refilling system 804.

Lubricant is injected into the reservoir 252 through a refill inlet (i.e., opening 634) via a refill passage 806 in the refill housing. The refill passage is the same passage that was used as the return passage 312 of the pump assembly housing 254. A refilling pump 824 is used to pump lubricant from a lubricant supply 826 to the inlet 808 of the refill housing and from there through the refill passage 806 to the tank 600 to refill it. Even though the refilling station 800 does not have a shaft that pushes the lifter 700 in the reservoir upward to open the check valve 702 at the top 604 of the reservoir, the check valve is oriented to permit the tank 600 to vent when pressure inside the interior of the tank exceeds ambient pressure, allowing lubricant into the reservoir 252. Once refilled, the reservoir 252 can be stored until ready for use. Because the refilling station 800 has a housing 802 that is substantially identical to the pump assembly housing 256, the reservoir 252 is able to engage the refilling station housing in the same way as it does when connected to the pump assembly 254. More particularly, the lower portion of the reservoir bottom 606 fits inside an annular face 810 of the collar connector 812, and the internally threaded surface 642 of the locking ring connector 640 mates with a threaded exterior surface 814 of a collar to fasten the reservoir 252 to the refilling station 800.

Figure 25:
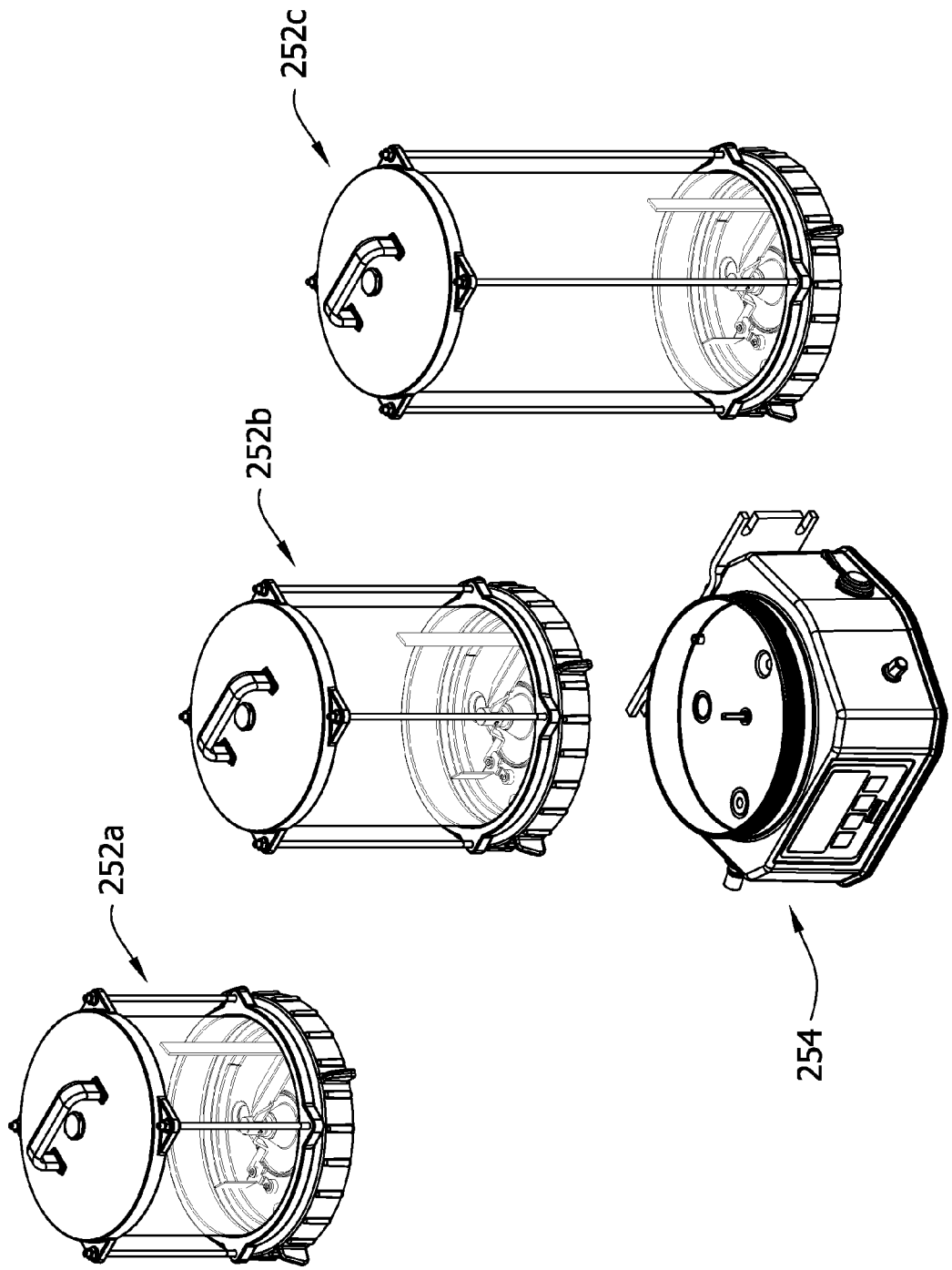
FIG. 25 is a perspective of a pump assembly in combination with reservoirs of differing configurations.

As shown in FIG. 25, the present system permits different size reservoirs (e.g., 252a, 252b, 252c) to be used with a common pump assembly 254 depending on the application. Any number of reservoirs can be pre-filled and stored for use as needed to minimize the down time of a pump assembly. That is, there is no need to wait for an empty reservoir to be refilled and then replaced on the same pump assembly from which it has been removed. The empty reservoir may be replaced immediately by an interchangeable and pre-filled reservoir removed from storage. As a result, the down time of the pump assembly is reduced substantially.

The construction of the refill housing 802 of the refill station 800 is substantially identical to the housing of the pump assembly, which reduces the cost of manufacture. Further, the refill housing contains no pump for pumping lubricant from the lubricant supply to the reservoir being refilled, further reducing cost. The pump 824 for performing this function resides outside the refill housing and may be any conventional pump.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A lubricant reservoir refilling system, comprising:
a removable reservoir including a tank for receiving lubricant, a refill inlet fluidly communicating with the tank, and a reservoir connector including a locking ring mounted for rotation on the tank and having a threaded surface; and
a refilling station including a refill housing having a refill housing connector configured for releasable connection with the reservoir connector, an inlet on the refill housing adapted for connection to a supply of lubricant, and an outlet on the refill housing positioned for fluid communication with the reservoir refill inlet when the reservoir is connected to the refilling station to allow delivery of lubricant from the refilling station through the reservoir refill inlet to refill the tank, the refill housing connector being functionally identical to a pump assembly connector on a pump assembly so the reservoir including the tank can be removed from the refilling station and removably connected to the pump assembly by connecting the reservoir connector to the pump assembly connector.

2. A lubricant reservoir refilling system as set forth in claim 1, wherein the refill housing connector comprises a collar.

3. A lubricant reservoir refilling system as set forth in claim 2, wherein the collar defines a recess sized for receiving the tank.

4. A lubricant reservoir refilling system as set forth in claim 3, wherein the collar includes a screw thread configured to connect to the threaded surface of the locking ring.

5. A lubricant reservoir refilling system as set forth in claim 1, wherein said removable reservoir is a first removable reservoir, and the refilling system further comprises a plurality of additional removable reservoirs, each additional removable reservoir including a tank for receiving lubricant, a refill inlet fluidly communicating with the tank, and a corresponding reservoir connector configured to connect with the refill housing connector for removably connecting the reservoir to the refilling station.

6. A lubricant reservoir refilling system as set forth in claim 5, wherein the plurality of removable reservoirs have a variety of different shapes and sizes.

7. A lubricant reservoir pumping system, comprising:
   a pump assembly including a housing having a pump assembly connector and a lubricant pump for pumping lubricant to a lubrication site, said lubricant pump having an inlet for receiving lubricant and an outlet for discharging lubricant at a pressure higher than that of lubricant at the inlet;
   a removable reservoir including a tank for holding lubricant, a reservoir connector for selectively connecting the tank to the pump assembly connector, a reservoir inlet, and an outlet positioned to fluidly communicate with the pump inlet when the tank is connected to the pump assembly housing, wherein the reservoir connector includes a locking ring mounted for rotation on the tank and having a threaded surface; and
   a refilling station including a refill housing having a refill housing connector functionally identical to the pump assembly connector, a refill inlet on the refill housing adapted for connection to a supply of lubricant, and a refill outlet on positioned to fluidly communicate with the reservoir inlet when the reservoir connector is connected to the refill housing connector for pumping lubricant into the reservoir inlet to refill the tank.

8. A lubricant reservoir pumping system as set forth in claim 7, wherein the refill housing connector comprises a collar.

9. A lubricant reservoir pumping system as set forth in claim 8, wherein the collar defines a recess sized for receiving the tank.

10. A lubricant reservoir pumping system as set forth in claim 9, wherein the collar includes a screw thread configured to connect to the threaded surface of the locking ring.

11. A removable lubricant reservoir for use with a pump assembly, the pump assembly including a housing having a pump assembly connector and a pump for pumping lubricant to a lubrication site, said pump having an inlet for receiving lubricant, said reservoir comprising:
   a tank having an interior adapted for holding lubricant and a bottom for retaining lubricant in the tank interior when the reservoir is removed from the pump assembly;
   a locking ring surrounding the bottom of and rotatably mounted on the tank, said ring including a threaded surface adapted for selectively connecting the tank to the pump assembly connector; and
   an outlet positioned for fluidly communicating with the pump inlet when the tank is connected to the housing of the pump assembly.

12. A removable lubricant reservoir as set forth in claim 11, further comprising a handle mounted on the tank for carrying the reservoir when disconnected from the pump assembly.

13. A removable lubricant reservoir as set forth in claim 11, further comprising a vent operatively connected to the interior of the tank for equalizing pressure inside the interior of the tank with pressure at the pump inlet when the tank is connected to the housing of the pump assembly.

14. A removable lubricant reservoir as set forth in claim 13, further comprising a valve in operative communication with the vent for closing the vent when the reservoir is disconnected from the housing of the pump assembly to prevent lubricant from leaking out of the outlet when the reservoir is disconnected from the housing of the pump assembly.

15. A removable lubricant reservoir as set forth in claim 14, wherein said valve comprises a check valve oriented to permit the tank to vent when pressure inside the interior of the tank exceeds ambient pressure.

16. A removable lubricant reservoir as set forth in claim 15, further comprising a lifter for opening the check valve when the tank is connected to the housing of the pump assembly to equalize pressure inside the interior of the tank with pressure at the pump inlet when the tank is connected to the housing of the pump assembly.

17. A lubricant refilling station for refilling a lubricant reservoir removed from a pump assembly, the pump assembly including a lubricant pump for pumping lubricant from the reservoir and a housing having a pump assembly connector for selectively connecting the reservoir to the pump assembly, the reservoir including a tank for receiving lubricant, a reservoir connector for selectively connecting the tank to the pump assembly connector, and a refill inlet on the tank for refilling the tank with lubricant, the lubricant refilling station comprising:
   a lubricant supply;
   a refill housing having a refill housing connector functionally identical to the pump assembly connector, said refill housing connector being adapted to connect to a locking ring having a threaded surface mounted for rotation on the tank;
   an inlet on the refill housing adapted for connection to the lubricant supply;
   an outlet on the refill housing positioned to fluidly communicate with the reservoir tank refill inlet when the tank is connected to the refill housing connector; and
   a refilling pump fluidly connected to the lubricant supply and the inlet of the refill housing for pumping lubricant from the lubricant supply to the refill inlet of the tank when the tank is connected to the housing of the lubricant refilling station.

18. A lubricant refilling station as set forth in claim 17, wherein the refill housing connector comprises a collar.

19. A lubricant refilling station as set forth in claim 18, wherein the collar defines a recess sized for receiving the tank.

20. A lubricant refilling station as set forth in claim 18, wherein the collar includes a screw thread configured to connect to the threaded surface of the locking ring.

21. A lubricant refilling station as set forth in claim 17, wherein the refilling pump resides outside the refill housing.

* * * * *